(12) United States Patent
Crossman

(10) Patent No.: US 10,363,912 B2
(45) Date of Patent: Jul. 30, 2019

(54) HYDRAULIC BRAKE ACTUATORS AND RELATED METHODS

(71) Applicant: Ford Global Technologies, LLC, Dearborn, MI (US)

(72) Inventor: John Crossman, Rockwood, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/454,620

(22) Filed: Mar. 9, 2017

(65) Prior Publication Data

US 2018/0257620 A1 Sep. 13, 2018

(51) Int. Cl.
| | |
|---|---|
| *B60T 8/40* | (2006.01) |
| *B60T 8/50* | (2006.01) |
| *B60T 8/34* | (2006.01) |
| *B60T 13/20* | (2006.01) |
| *B60T 13/18* | (2006.01) |
| *B60T 13/66* | (2006.01) |
| *F04B 7/00* | (2006.01) |
| *B60T 8/32* | (2006.01) |
| *B60T 8/36* | (2006.01) |
| *F16D 65/28* | (2006.01) |
| *F16D 121/04* | (2012.01) |
| *F16D 125/02* | (2012.01) |

(52) U.S. Cl.
CPC ............... *B60T 8/50* (2013.01); *B60T 8/326* (2013.01); *B60T 8/341* (2013.01); *B60T 8/344* (2013.01); *B60T 8/368* (2013.01); *B60T 8/3615* (2013.01); *B60T 8/4031* (2013.01); *B60T 13/18* (2013.01); *B60T 13/20* (2013.01); *B60T 13/662* (2013.01); *F04B 7/0007* (2013.01); *F16D 65/28* (2013.01); *B60Y 2400/92* (2013.01); *F16D 2121/04* (2013.01); *F16D 2125/023* (2013.01)

(58) Field of Classification Search
CPC .... F04B 7/0007; F04B 7/0046; F04B 7/0057; F04B 7/0061; F04B 7/0065; F04B 7/0096; F04B 9/042; F04B 9/045; F04B 19/22; B60T 8/4031
See application file for complete search history.

(56) References Cited

U.S. PATENT DOCUMENTS 3,699,848 A * 10/1972 Prendergast .......... F03C 1/0406
   91/487
3,750,533 A * 8/1973 Thoma ................. F01B 1/0644
   91/498

(Continued)

FOREIGN PATENT DOCUMENTS

| CN | 204452422 | 7/2015 |
|---|---|---|
| JP | 2001310730 | 11/2001 |
| JP | 2014173566 | 9/2014 |

*Primary Examiner* — Nicholas J Lane
(74) *Attorney, Agent, or Firm* — Ray Coppiellie; Hanley, Flight & Zimmerman, LLC

(57) ABSTRACT

Example hydraulic brake actuators and related methods are disclosed herein. An example hydraulic brake actuator includes a rotary valve disposed in a bore of a housing. The rotary valve includes a shaft rotatably disposed within a sleeve. The sleeve and the shaft have ports that align at certain rotational positions to create a flow path between the bore and an inner chamber of the shaft. The example hydraulic brake actuator also includes a pump coupled to the shaft to increase and decrease a pressure within the inner chamber of the shaft.

20 Claims, 13 Drawing Sheets

(56) References Cited

U.S. PATENT DOCUMENTS

| | | | | |
|---|---|---|---|---|
| 4,776,768 | A | * | 10/1988 | Kondoh ................ B60T 13/148 |
| | | | | 277/573 |
| 5,004,406 | A | * | 4/1991 | Kuroyanagi ............ B29C 47/54 |
| | | | | 417/273 |
| 5,529,388 | A | * | 6/1996 | Yasui ...................... B60T 8/173 |
| | | | | 303/115.2 |
| 5,624,165 | A | | 4/1997 | Moon |
| 6,851,763 | B1 | | 2/2005 | Feigel |
| 7,769,519 | B2 | | 8/2010 | Kamiya et al. |
| 2010/0187899 | A1 | * | 7/2010 | Suzuki .................... B60T 8/404 |
| | | | | 303/3 |
| 2013/0327605 | A1 | * | 12/2013 | Bachmaier ............. B60T 13/10 |
| | | | | 188/361 |
| 2016/0195074 | A1 | * | 7/2016 | Beard ................... F04B 7/0007 |
| | | | | 417/500 |

\* cited by examiner

HYDRAULIC BRAKE ACTUATORS AND RELATED METHODS

FIELD OF THE DISCLOSURE

This disclosure relates generally to brake actuators and, more particularly, to hydraulic brake actuators and related methods.

BACKGROUND

Traditional vehicle braking systems employ a fluid-filled master cylinder and one or more brakes with brake cylinders. Fluid lines connect the master cylinder to the brake cylinders. When a driver presses on the brake pedal, a piston in the master cylinder forces brake fluid through the fluid lines to the brake cylinders, thereby causing the brakes to provide braking force against a disc or drum.

Many known vehicles also include an anti-lock brake system (ABS) that operates to reduce pressure in the brake cylinders if the wheels of the vehicle lock up and/or otherwise cease rotating. In such known systems, a valve is disposed in the fluid line between the master cylinder and the brake cylinder that closes the fluid connection between the master cylinder and brake cylinder. Then, a solenoid is activated to relieve pressure from the brake cylinder. Once the pressure is relieved, a separate pump is used to reapply pressure to the brake cylinder. The solenoid and the pump are used to alternately apply pressure and relieve pressure at a high frequency, which enables the brake to slow the vehicle without locking the wheel.

SUMMARY

An example hydraulic brake actuator disclosed herein includes a rotary valve disposed in a bore of a housing. The rotary valve includes a shaft rotatably disposed within a sleeve. The sleeve and the shaft have ports that align at certain rotational positions to create a flow path between the bore and an inner chamber of the shaft. The example hydraulic brake actuator also includes a pump coupled to the shaft to increase and decrease a pressure within the inner chamber of the shaft.

An example hydraulic brake actuator disclosed herein includes a reservoir and a radial piston pump including a cylinder and a piston movable into and out of the cylinder. The cylinder is disposed within a cam. The example hydraulic brake actuator also includes a motor to rotate the radial piston pump in a first direction to pump fluid from the reservoir to a brake and rotate the radial piston pump in a second direction to pump fluid from the brake to the reservoir.

An example machine readable storage medium includes instructions that, when executed, cause a machine to at least activate a motor of a hydraulic brake actuator to pump fluid out of a brake until the brake is open, activate the motor at a predetermined speed to pump fluid into the brake, measure a pressure of the fluid in the brake, and determine an amount of pad wear of the brake based on a run time of the motor until a threshold pressure is reached.

Figure 1:
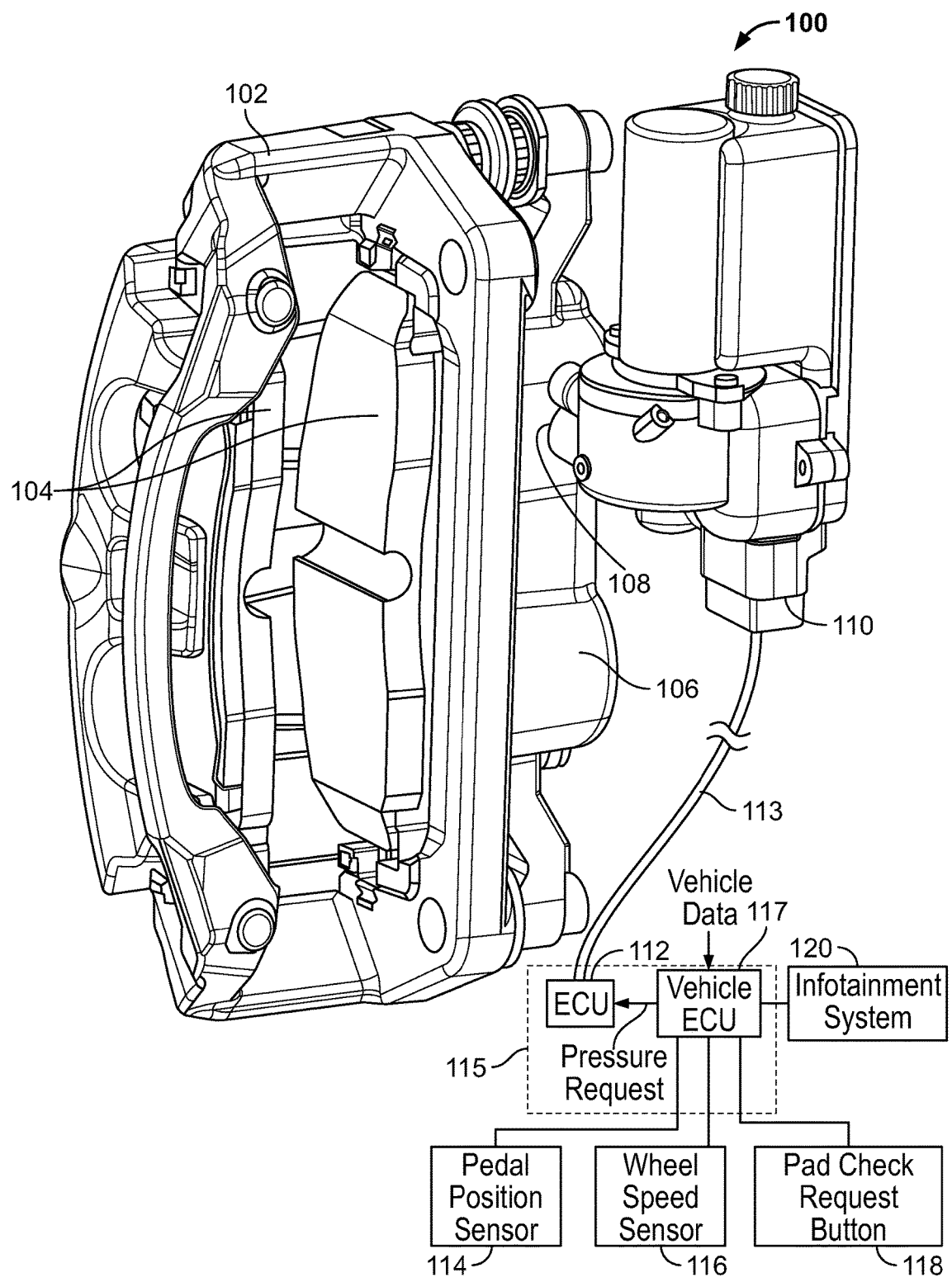
FIG. 1 illustrates an example hydraulic brake actuator constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example hydraulic brake actuators for use with vehicle brakes. The hydraulic brake actuators may be implemented as standalone devices that may be coupled to or proximate a brake (e.g., a brake caliper, a drum brake, etc.) to provide pressurized hydraulic fluid to the brake. Vehicle brakes typically include a brake cylinder and a piston that is slidable within the brake cylinder. When pressurized hydraulic fluid is provided to the brake cylinder, the piston slides outward, thereby applying brake pressure between a brake pad and moving part (e.g., a rotor or drum) of the vehicle to slow the vehicle.

In general, the example hydraulic brake actuators disclosed herein include a bi-directional pump that operates in one direction to pump fluid into a brake cylinder to apply braking pressure and operates in the opposite direction to pump fluid out of the brake cylinder and/or otherwise relieve pressure from the brake cylinder. In some examples, the pump is integrated with a rotary valve that includes a sleeve and a shaft that is rotatably disposed within the sleeve. The shaft and the sleeve include ports that open and close as the shaft is rotated. At one rotational position, two of the ports align and create a fluid passageway between a fluid reservoir and an inner chamber of the shaft, and in another rotational position, two other ports align and create a fluid passageway between the inner chamber of the shaft and the brake cylinder. Depending on the direction of rotation, the pump is configured to create a vacuum or pressure in the inner chamber of the shaft as certain ones of the ports align.

For example, when the pump and the shaft are rotated in one direction, the activation of the pump is timed to create a vacuum in the inner chamber as the ports align and create a passageway between the reservoir and the inner chamber, thereby pulling fluid from the reservoir into the inner chamber. As the pump and the shaft of the rotary valve continue to rotate, the reservoir passageway is closed, and other ports align to create a passageway between the inner chamber and the brake cylinder. At this point, the pump activated to increase pressure in the inner chamber, thereby pushing the fluid from the inner chamber into the brake cylinder and, thus, increasing braking pressure. The pump and rotary valve may also be rotated in the opposite direction to pull fluid out of the brake cylinder and pump the fluid back into the reservoir, thereby releasing pressure from the brake cylinder. Thus, the pump and valve can be used to transfer fluid between a reservoir and a brake cylinder.

Some example hydraulic brake actuators disclosed herein include a motor that rotates the pump and the shaft of the rotary valve in one direction or the opposite direction. The pump and the rotary valve may be rotated at a very high speed via the motor to quickly pump fluid into the brake cylinder or relieve pressure from the brake cylinder. The hydraulic brake actuator can be used to apply braking pressured based on a position of a brake pedal of the vehicle. For example, as the driver presses on the brake pedal, the motor is activated to rotate the pump and valve to pump fluid into the brake, thereby increasing braking pressure. The hydraulic brake actuators provide hydraulic braking power using a relatively small, compact pump and valve configuration that is significantly smaller and lighter than known braking systems that use a master cylinder and lengthy fluid lines to provide hydraulic fluid to the brake cylinders.

In some examples disclosed herein, the pump is implemented as a radial piston pump that includes a cylinder and a piston that is movable into and out of the cylinder. The cylinder and the piston are disposed within an opening of an eccentric external cam. The piston extends outward from the cylinder and engages an inner surface of the opening of the cam. As the cylinder and the piston rotate, the piston is moved into and out of the inner chamber of the cylinder, thereby increasing and decreasing the pressure inside of the inner chamber of the rotary valve. In some examples disclosed herein, the cam is movable radially to change a displacement of the piston as the pump rotates. As such, the motor of the hydraulic brake actuator can operate at or near its maximum power output throughout the pumping process, which enables the use of smaller motors that draw less current.

In addition to applying normal braking operations, the hydraulic brake actuators disclosed herein may be used to perform anti-lock brake operations. For example, if the wheel of the vehicle is locked up, the example hydraulic brake actuator can be operated to alternately release pressure from the brake cylinder and apply pressure to the brake cylinder. As such, the example brake requires significantly fewer parts and equipment than known braking systems that have separate braking systems and ABS systems. Further, unlike known ABS systems that use a separate release system and pump system, the example hydraulic brake actuators operate to both apply pressure and release pressure to/from the brake cylinder. Thus, the same device may be used to perform the ABS functions. Also, the release systems of known ABS systems utilize intake and exhaust check valves that are complex, have inherent pumping losses, are noisy and are limited to pump flow in a single direction. The example hydraulic brake actuators disclosed herein utilize rotary valves, which are generally less complex, more efficient and quieter than the above-mentioned known check valves. Further, by using a rotary valve to provide bi-directional pumping, the example hydraulic brake actuators can be used on electronic brake booster applications where higher cost ball screw pistons pumps are generally used.

Also disclosed herein are example methods that may be performed with the example hydraulic brake actuators to check brake pad wear. An example method includes activating a motor of the hydraulic brake actuator to pump (and/or otherwise) draw fluid from the brake until the brake is open (e.g., a brake caliper is in the full open position). Once the brake is open, the motor of the hydraulic brake actuator is activated at a predetermined speed or rate to pump fluid into the brake until the fluid pressure in the brake reaches a target pressure. A linear displacement of the brake piston can be determined based on the run time of the motor until the target pressure is reached. This linear displacement can be correlated to an amount of pad wear. In some examples, the amount of pad wear may be displayed to the driver to indicate whether or not the pad(s) of the brake need to be serviced (e.g., replaced). Thus, the example hydraulic brake actuators described herein can be used to increase safety and ensure reliability of the brakes.

FIG. 1 illustrates an example hydraulic brake actuator 100 constructed in accordance with the teachings of this disclosure. The hydraulic brake actuator 100 is implemented with an example brake 102 for a vehicle. In the illustrated example, the brake 102 is a caliper brake. However, in other examples, the hydraulic brake actuator 100 may be implemented with any other type of brake, such as a drum brake. In the illustrated example, the brake 102 includes pads 104. When a brake cylinder 106 of the brake 102 is pressurized, the pads 104 move together and toward a disc (sometimes referred to as a rotor) to engage the disc and, thus, slow the vehicle. When the pressure in the brake cylinder 106 is released, the pads 104 move apart and away from the disc, thereby allowing the disc to rotate.

The example hydraulic brake actuator 100 includes a fluid reservoir and a pump (disclosed in further detail herein) to pump fluid into or out of the brake cylinder 106 to apply or relieve braking pressure. In the illustrated example, the hydraulic brake actuator 100 is coupled to an exterior of the brake 102 (e.g., to a body or housing of the brake 102). An outlet 108 (e.g., a fluid port) of the hydraulic brake actuator 100 is fluidly coupled to a fluid port on the brake 102 for supplying fluid to the brake cylinder 106. The hydraulic brake actuator 100 pumps fluid into the brake cylinder 106 or draws fluid out of the brake cylinder 106, thereby controlling the braking operations of the brake 102. While the hydraulic brake actuator 100 illustrated in FIG. 1 is coupled to an exterior of the brake 102, in other examples the hydraulic brake actuator 100 is integrated into the housing or casting of the brake 102. In other examples, the hydraulic brake actuator 100 may be mounted adjacent the brake 102 (e.g., on the axle, on the strut or hub, on the frame of the vehicle, etc.) and fluidly coupled to the brake 102 via a fluid line.

In the illustrated example, the hydraulic brake actuator 100 includes a connector 110 for electrically/communicatively coupling the hydraulic brake actuator 100 to an electronic control unit (ECU) 112 or other brake controller of a brake control system 115. In the illustrated example, the hydraulic brake actuator 100 is connected to the ECU 112 via a cable 113. However, in other examples, the connection between the hydraulic brake actuator 100 and the ECU 112 may be wireless (e.g., via Bluetooth®). The ECU 112 controls a pump of the hydraulic brake actuator 100 to operate in one direction to apply pressure to the brake 102 or in the other direction to relieve pressure from the brake 102. In the illustrated example, the brake control system 115 includes a vehicle ECU 117 (e.g., an engine control unit or master control unit). In some examples, the ECU 112 receives pressure commands from the vehicle ECU 117. For example, when a driver of the vehicle presses on a brake pedal, the vehicle ECU 117 determines a desired braking pressure and transmits the pressure request to the ECU 112, which activates (e.g., via a control signal) the hydraulic brake actuator 100 to pump fluid into the brake cylinder 106 at a pressure corresponding to the desired braking pressure. Likewise, when the driver releases the brake pedal, the ECU 112 actives the hydraulic brake actuator 100 to pump fluid out of the brake cylinder 106 and/or otherwise relieve pressure from the brake cylinder 106. In some examples, the vehicle ECU 117 determines a desired braking pressure based on a signal from a pedal position sensor 114. The pedal position sensor 114 measures the position of the brake pedal, which can be correlated to a desired amount of braking pressure to be applied. While in the illustrated example the ECU 112 and the vehicle ECU 117 are depicted as separate control units, in other examples the ECU 112 and the vehicle ECU 117 may be combined (e.g., the engine control unit or master control unit of the vehicle may directly control the hydraulic brake actuator 100). In some examples, a separate hydraulic brake actuator may be implemented with each brake on a vehicle. In some such examples, the brake control system 115 may include separate ECUs for each of the hydraulic brake actuators, and each of the ECUs may receive pressure requests/commands from with the vehicle ECU 117. In other examples, one ECU may operate more than one hydraulic brake actuator.

In addition to or as an alternative to providing regular braking functions, the example hydraulic brake actuator 100 may be used to provide anti-lock braking power to the brake 102. For example, if the brake 102 locks up (e.g., ceases rotating), the hydraulic brake actuator 100 may alternately relieve pressure from the brake 102 and apply pressure to the brake 102 at a relatively high frequency (e.g., 15 Hertz (Hz)) to keep the brake 102 (and the wheel) from the locking up. In some examples, the vehicle ECU 117 determines the brake 102 is locked up based on a speed of the wheel measured by a wheel speed sensor 116. In some examples, the vehicle ECU 117 determines whether the brake 102 is locked up by comparing the rotational speed of the wheel (measured by the wheel speed sensor 116) to the rotational speed of the other wheels of the vehicle (using one or more other wheel speed sensors) and/or by comparing a deceleration rate of the wheel to a threshold rate (which may indicate an impending wheel lock). Additionally or alternatively, the vehicle ECU 117 may determine whether the wheel has locked up based on other vehicle data (e.g., roll or yaw measurements). When a wheel lock is detected, the vehicle ECU 117 sends one or more pressure commands to the ECU 112 to activate the hydraulic brake actuator 100 to relieve braking pressure from the brake 102 and reapply braking pressure to the brake 102. As such, in some examples, the hydraulic brake actuator 100 provides both regular braking functions and anti-lock braking functions. As a result, the example hydraulic brake actuator 100 employs significantly fewer parts and components to provide these two functions than known vehicles that have two separate systems for these functions. In some examples, the example hydraulic brake actuator 100 may be used to determine the amount of pad wear on a brake, as disclosed in further detail in conjunction with FIG. 12. In the illustrated example of FIG. 1, the vehicle ECU 117 is communicatively coupled to a pad check request button 118 and to a vehicle infotainment system 120, which are also disclosed in further detail in conjunction with FIG. 12.

Figure 2:
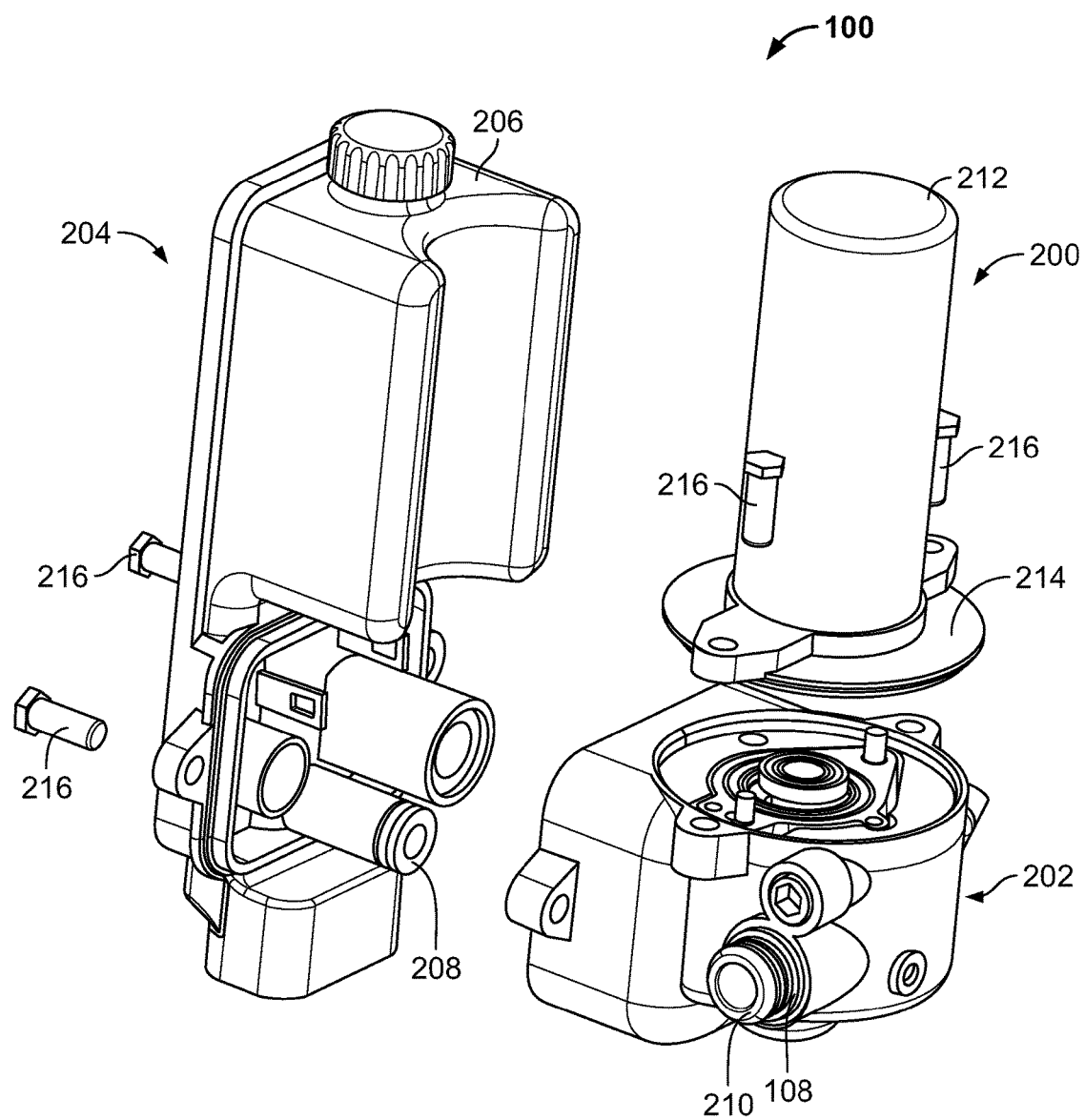
FIG. 2 is an exploded view of the example hydraulic brake actuator of FIG. 1 having an example motor assembly, an example pump assembly and an example reservoir assembly.

FIG. 2 is a partially exploded view of the example hydraulic brake actuator 100. In the illustrated example, the hydraulic brake actuator 100 includes a motor assembly 200, a pump assembly 202, and a reservoir assembly 204. The reservoir assembly 204 includes a reservoir 206 containing fluid. A fluid connector 208 on the reservoir assembly 204 plugs into the pump assembly 202 to transfer the fluid between the reservoir 206 to the pump assembly 202. The motor assembly 200 drives the pump assembly 202 to pump fluid from the reservoir 206 into the brake 102 (FIG. 1) to apply braking pressure or out of the brake 102 back into the reservoir 206 to relieve braking pressure. Fluid is pumped to and from the brake 102 via the outlet 108 of the pump assembly 202. In the illustrated example, a connector 210 is disposed in the outlet 108 and may be used to fluidly connect the outlet 108 to the fluid port on brake 102 (FIG. 1).

In the illustrated example of FIG. 2, the motor assembly 200 includes a motor 212 and a mounting plate 214 for mounting the motor 212 to the pump assembly 202. The motor 212 may be a direct current (DC) motor, for example. The motor 212 is activated and/or otherwise powered via the connector 110 (FIG. 1). The motor 212 has an output shaft that engages a flow control assembly (disclosed in further detail herein) in the pump assembly 202. The motor 212 may be activated to rotate the output shaft in one direction or the other direction to pump between the brake 102 and the reservoir 206. In the illustrated example, the motor assembly 200 and the reservoir assembly 204 are coupled to the pump assembly 202 via a plurality of bolts 216. In other examples, other mechanical fastener(s) may be used in addition to or as an alternative to the bolts 216 to couple the motor assembly 200, the pump assembly 202 and/or the reservoir assembly 204.

Figure 3:
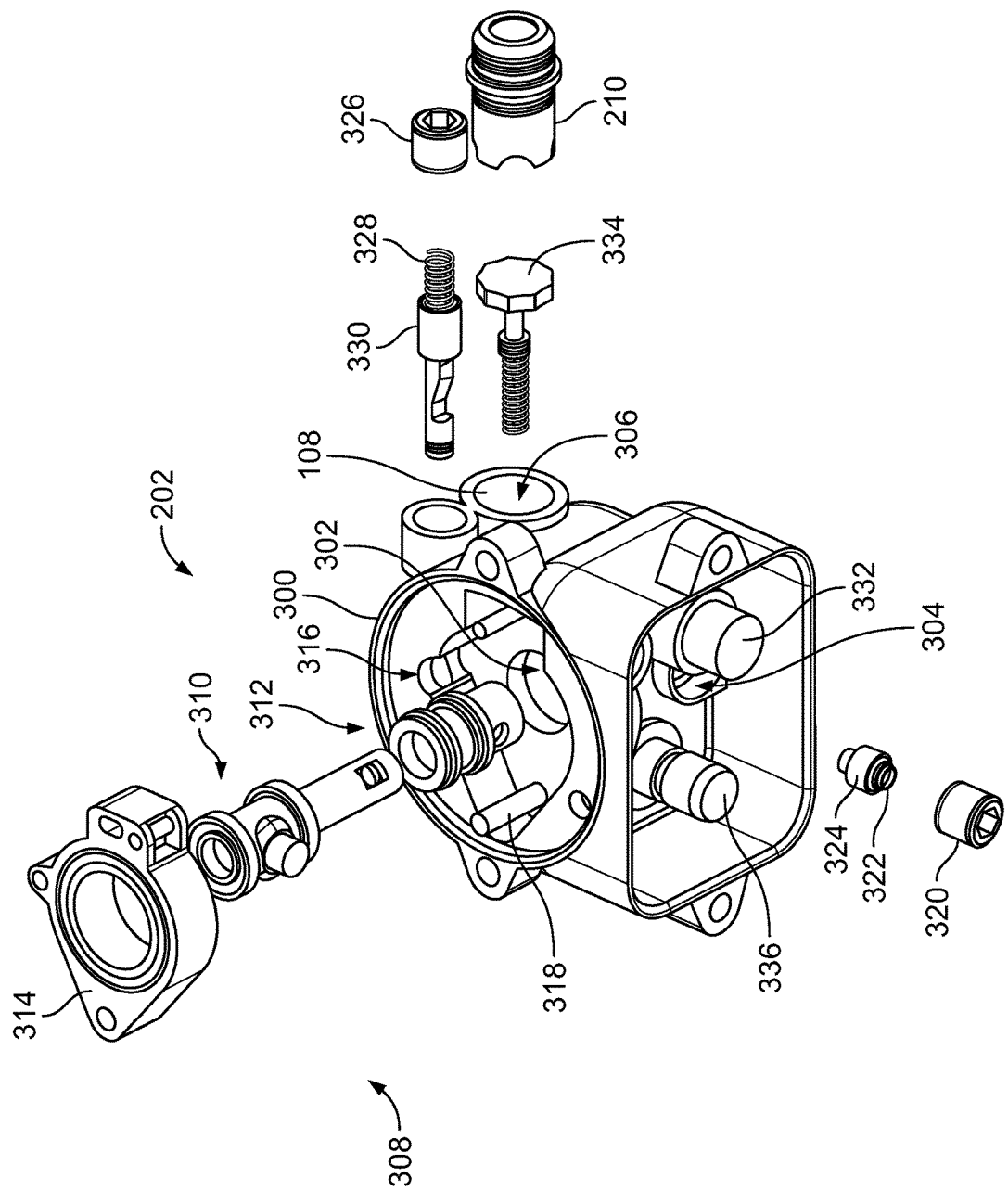
FIG. 3 is an exploded view of the example pump assembly of FIG. 2.

FIG. 3 is an exploded view of the example pump assembly 202. The example pump assembly 202 includes a body or housing 300 having a bore 302. In the illustrated example, the housing 300 includes a reservoir passageway 304 (e.g., a first passageway) that fluidly couples the reservoir 206 (FIG. 2) to the bore 302. In particular, when the reservoir assembly 204 (FIG. 2) is coupled to the pump assembly 202, the fluid connector 208 (FIG. 2) of the reservoir assembly 204 extends into the reservoir passageway 304, thereby providing a flow path between the reservoir 206 and the bore 302. In the illustrated example, the housing 300 also includes a brake passageway 306 (e.g., a second passageway) that fluidly couples the bore 302 to the outlet 108 and, thus, to the brake 102 (FIG. 1).

In the illustrated example of FIG. 3, the pump assembly 202 includes a flow control assembly 308 disposed within the bore 302 that controls the flow of fluid through the bore 302. To apply braking pressure, the flow control assembly 308 draws fluid from the reservoir 206 (FIG. 2) into the bore 302 (via the reservoir passageway 304), and pumps the fluid from the bore 302 to the outlet 108 (via the brake passageway 306) to the brake 102 (FIG. 1). To reduce braking pressure, the flow control assembly 308 draws fluid from the brake 102 (FIG. 1) into the bore 302 (via the brake passageway 306), and pumps the fluid back into the reservoir 206 (FIG. 2) (via the reservoir passageway 304). Thus, the flow control assembly 308 provides bi-directional pumping of fluid between the reservoir 206 (FIG. 2) and the brake 102 (FIG. 1).

In the illustrated example of FIG. 3, the flow control assembly 308 includes a pump 310 and a rotary valve 312, which are disclosed in further detail herein. The output shaft of the motor 212 (FIG. 2) couples to the top of the pump 310 and rotates the pump 310 and a portion of the valve 312 when activated. When the pump 310 and the valve 312 are rotated in one direction, fluid is transferred from the reservoir 206 (FIG. 2) to the brake 102 (FIG. 1), and when the pump 310 and the valve 312 are rotated in the other direction, fluid is transferred from the brake 102 (FIG. 1) back into the reservoir 206 (FIG. 2).

In the illustrated example of FIG. 3, the pump assembly 202 includes a cam 314 (e.g., a ring) that is disposed within a cam cavity 316 formed in the housing 300 above the bore 302. When the flow control assembly 308 is disposed in the bore 302, the pump 310 is disposed within the cam 314. As will be described in further detail herein, the cam 314 is movable to change the flow rate of the pump 310. In the illustrated example, the cam 314 is pivotable about a pivot pin 318. In other examples, the cam 314 is movable (e.g., slidable) in a linear direction. In the illustrated example, the pump assembly 202 also includes a retainer 320, a spring 322 and a cam pusher 324 to bias to the cam 314 in one direction, and a retainer 326, a spring 328 and a flow control pin 330 to change the displacement of the cam 314, which are disclosed in further detail herein.

In the illustrated example of FIG. 3, the pump assembly 202 includes a pressure sensor 332 that measures the pressure of the fluid at the outlet 108 and, thus, in the brake 102 (FIG. 1). The flow control assembly 308 may be operated to bring the outlet pressure to a desired pressure by measuring the pressure at the outlet 108. For example, the motor 212 (FIG. 2) may be activated to drive the flow control assembly 308 to pump fluid to the outlet 108 until a desired braking pressure is reached (as measured by the sensor 332).

Figure 4:
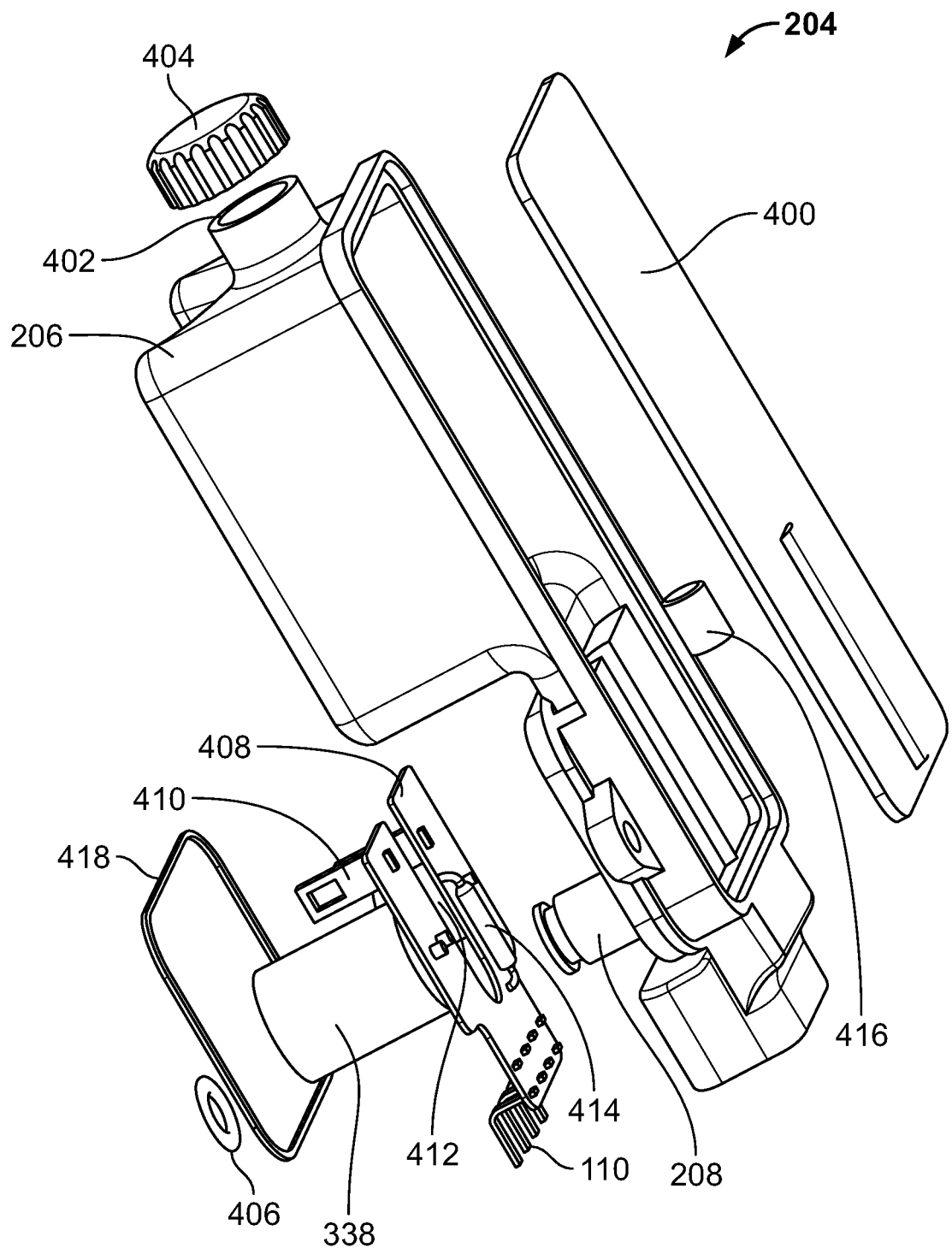
FIG. 4 is an exploded view of the example reservoir assembly of FIG. 3.

In some examples, the hydraulic brake actuator 100 includes a parking brake valve to lock fluid in the brake 102 (FIG. 1). In the illustrated example of FIG. 3, the parking brake valve is formed by a shuttle 334 and a solenoid (formed by a pin 336 and a coil 338 (referenced in FIG. 4)). The shuttle 334 is movable within the brake passageway 306 between an open position to allow fluid flow through the brake passageway 306 and a closed position that locks pressurized fluid at the outlet 108 and, thus, in the brake 102. In some examples, the connector 210 acts as a stop for the shuttle 334. The pin 336 opens a vent passageway on the back side of the shuttle 334 to vent the passageway to the reservoir 206. The pin 336 of the solenoid is activated by the coil 338 (FIG. 4). When the reservoir assembly 204 is coupled to the pump assembly 202, the pin 336 is inserted into the coil 338 (FIG. 4). The coil 338 (FIG. 4) may be energized to move the pin 336 to open or close the vent passageway. An example of the parking brake valve that may be implemented in the hydraulic brake actuator 100 is disclosed in U.S. application Ser. No. 15/271,895, titled "Hydraulic Brake Apparatus and Related Methods," filed Sep. 21, 2016, which is hereby incorporated by reference in its entirety. The parking brake valve can be used to lock fluid in the brake 102 (FIG. 1) as described in the above-referenced application. The details of the parking brake valve are not repeated herein. Instead, the interested reader is referred to the above-referenced application for a full written description of an example parking brake valve.

FIG. 4 is an exploded view of the example reservoir assembly 204. In the illustrated example, the reservoir assembly 204 includes the reservoir 206 to hold hydraulic fluid (e.g., brake fluid). The reservoir 206 includes a cover 400 that may be removed to expose the inside of the reservoir 206. In some examples, the cover 400 is translucent (and may contain level indicators) so that a person can see into the reservoir 206 and determine the amount of fluid in the reservoir 206. The reservoir 206 also includes an opening 402 and a cap 404 that may be removed from the opening 402 to add more fluid to the reservoir 206. The fluid connector 208 is located at the bottom the reservoir 206. When the reservoir assembly 204 is coupled to the pump assembly 202 (FIG. 3), the fluid connector 208 extends into the reservoir passageway 304 (FIG. 3) to supply brake fluid to and from the reservoir 206. In some examples, a seal 406 is provided at the interface between the fluid connector 208 and the reservoir passageway 304 (FIG. 3).

In the illustrated example of FIG. 4, the reservoir assembly 204 includes a circuit board 408 (e.g., a printed circuit board (PCB)) with the electrical connections and hardware to operate the components of the hydraulic brake actuator 100. The circuit board 408 includes the connector 110, which is to be connected to the ECU 112 (FIG. 1) via the cable 113. In other examples, the circuit board 408 may communicate with the ECU 112 (FIG. 1) via a wireless connection (e.g., Bluetooth®). In the illustrated example, the coil 338 of the parking brake solenoid is coupled to the circuit board 408.

In the illustrated example of FIG. 4, the circuit board 408 also include motor terminals 410. The pump assembly 202 (FIG. 3) includes one or more wired connections that connect the terminals 410 to the motor 212 (FIG. 2) when the reservoir assembly 204 is coupled to the pump assembly 202 (FIG. 4). The reservoir assembly 204 includes a pressure sensor connector 412 that connects to the pressure sensor 332 when the reservoir assembly 204 is coupled to the pump assembly 202 (FIG. 3). The reservoir assembly 204 also includes a fluid level sensor 414 (e.g., a reed switch). The fluid level sensor 414 determines a level of fluid in the reservoir 206 based on a position of a float magnet 416 disposed in the bottom of the reservoir 206. In the illustrated example, the reservoir assembly 204 includes a flange seal 418 that is captured between the reservoir assembly 204 and the pump assembly 202 (FIG. 2) to provide a sealing interface.

Figure 5:
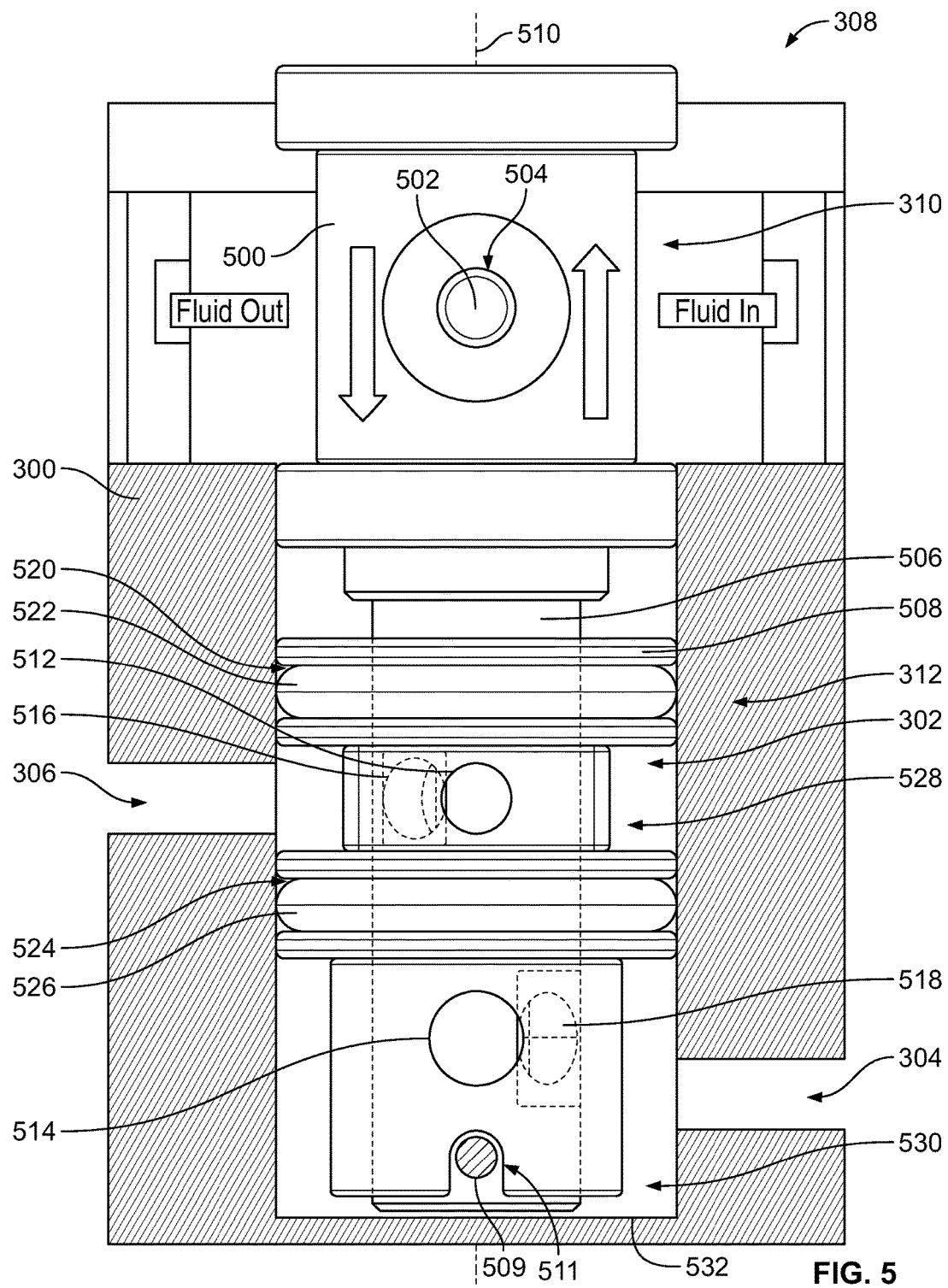
FIG. 5 is a partial cross-sectional view of the example pump assembly of FIG. 2 including an example flow control assembly having an example pump and an example valve.

FIG. 5 is a side view of the example flow control assembly 308 disposed in the bore 302 of the housing 300. In FIG. 5, the housing 300 has been cross-sectioned. As mentioned above, the flow control assembly 308 includes the pump 310 and the rotary valve 312 that operate to move fluid through the bore 302 between the reservoir passageway 304 and the brake passageway 306 and, thus, between the reservoir 206 (FIG. 2) and the brake 102 (FIG. 1).

In the illustrated example, the pump 310 is implemented as a radial piston pump that includes a cylinder 500 and a piston 502. The piston 502 is movable into and out of an inner chamber of the cylinder 500 through a channel 504 in the cylinder 500. As seen from the view from FIG. 5, the piston 502 moves into and out of the drawing. As the piston 502 moves into and out of the cylinder 500, the piston 502 changes the volume of the inner chamber of the cylinder 500, thereby increasing or decreasing the pressure within the inner chamber. In particular, as the piston 502 moves into the cylinder 500, increased pressure is created in the inner chamber, and as the piston 502 moves out of the cylinder 500, decreased pressure (e.g., a vacuum) is created in the inner chamber. As the cylinder 500 rotates, the piston 502 is moved reciprocally into and out of the cylinder 500, as described in further detail here.

In the illustrated example, the pump 310 is integrated with the rotary valve 312. In particular, the cylinder 500 is coupled to a shaft 506 that forms part of the rotary valve 312. The rotary valve 312 is formed by a sleeve 508 and the shaft 506. The shaft 506 is shown in dashed lines in the sleeve 508. The sleeve 508 remains stationary within the bore 302 of the housing 300 and the shaft 506 rotates within the sleeve 508. In particular, the pump 310 and the shaft 506 rotate about a rotational axis 510, which is substantially aligned along a longitudinal axis of the pump 310 and the rotary valve 312. In some examples, to prevent the sleeve 508 from moving (e.g., rotating), a pin 509 extends from a side wall of the bore 302 and into a slot 511 formed in the bottom of the sleeve 508. In the illustrated example, the pin 509 is shown as cross-sectioned and extends outward from the page and is coupled to the side wall of the bore 302. In other examples, the pin 509 extends from another surface of the bore 302 (e.g., a bottom 532). In still other examples, the sleeve 508 may be coupled to the bore 302 in other manners (e.g., via an adhesive, welding, etc.) to prevent the sleeve 508 from moving.

In the illustrated example, the sleeve 508 and the shaft 506 include a plurality of ports that align at different rotational positions to create fluid flow paths between the bore 302 and an inner chamber of the shaft 506. For example, in the illustrated example, the sleeve 508 includes a first port 512 and a second port 514. The shaft 506 includes a first port 516 at the same height as the first port 512 of the sleeve 508, and a second port 518 at the same height as the second port 514 of the sleeve 508. At certain rotational positions, the first port 516 of the shaft 506 aligns (or at least partially overlaps) with the first port 512 of the sleeve 508. At other rotational positions, the second port 518 of the shaft 506 aligns (or at least partially overlaps) with the second port 514 of the sleeve 508. In some examples, the diametric clearance between the sleeve 508 and the shaft 506 is about 0.0005 inches (in), which ensures minimal leakage losses between the sleeve 508 and the shaft 506 while still enabling the shaft 506 to rotate within the sleeve 508.

In the illustrated example, the sleeve 508 includes a first seal gland 520 having a first seal 522 and a second seal gland 524 having a second seal 526. The first and second seals 522, 526 engage the inner wall of the bore 302 and separate the bore 302 into an upper section 528 and a lower section 530 (e.g., a first section and a second section). As illustrated in FIG. 5, the upper section 528 of the bore 302 is in fluid communication with the brake passageway 306, and the lower section 530 of the bore 302 is in fluid communication with the reservoir passageway 304. The first port 512 of the sleeve 508 is between the first and second seals 522, 526 and, thus, in fluid communication with the upper section 528 of the bore 302, and the second port 514 of the sleeve 508 is below the second seal 526 and the bottom 532 of the bore 302 and, thus, in fluid communication with the lower section 530 of the bore 302. Therefore, when the first ports 512, 516 align (or at least partially overlap), a fluid flow path is formed between the inner chamber of the shaft 506 and the brake passageway 306. Likewise, when the second ports 514, 518 align (or at least partially overlap), a flow path is formed between the inner chamber of the shaft 506 and the reservoir passageway 304.

When the pump 310 and the shaft 506 are rotated in one direction, fluid is drawn from the reservoir passageway 304 into the inner chamber of the shaft 506 as the second ports 514, 518 overlap, and then fluid is pushed out of the inner chamber of the shaft 506 and into the brake passageway 306 when the first ports 512, 516 overlap. In such an example, the flow control assembly 308 pumps fluid into the brake 102 (FIG. 1) to apply the braking pressure. The flow control assembly 308 may also operate in the reverse direction. For instance, when the pump 310 and the shaft 506 are rotated in the opposite direction, fluid is drawn from the brake passageway 306 and into the inner chamber of the shaft 506 as the first ports 512, 516 overlap, and then the fluid is pushed out of the inner chamber of the shaft 506 and into the reservoir passageway 304 when the second ports 514, 518 overlap. In such an example, the flow control assembly 308 pumps fluid out of and/or otherwise relieves braking pressure from the brake 102 (FIG. 1). As will be disclosed in further detail herein, the pump 310 is configured to create a vacuum or pressure in the inner chamber of the shaft 506 as the shaft 506 rotates. Depending on the direction of rotation, the pump 310 drives fluid in one direction or the other (e.g., from the reservoir 206 (FIG. 2) to the brake 102 (FIG. 1), or from the brake 102 to the reservoir 206).

Figure 6A:
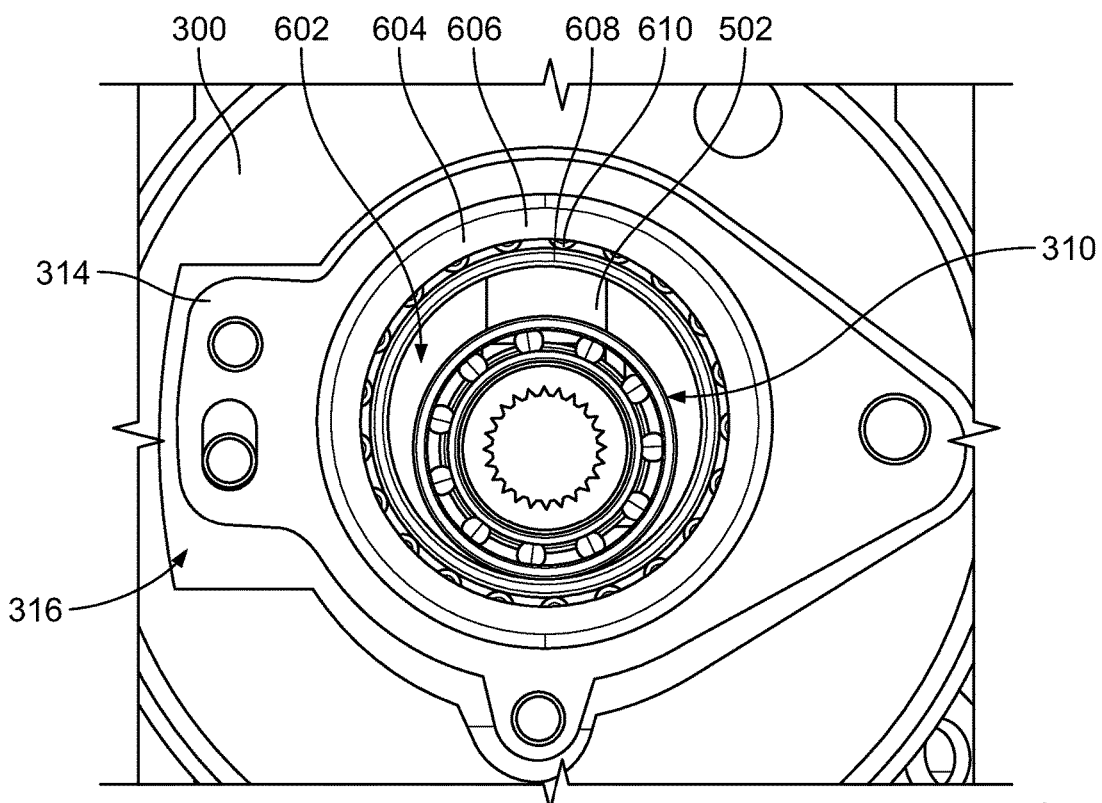
FIG. 6A is a top view of the example pump of FIG. 5 in a first position.
Figure 6B:
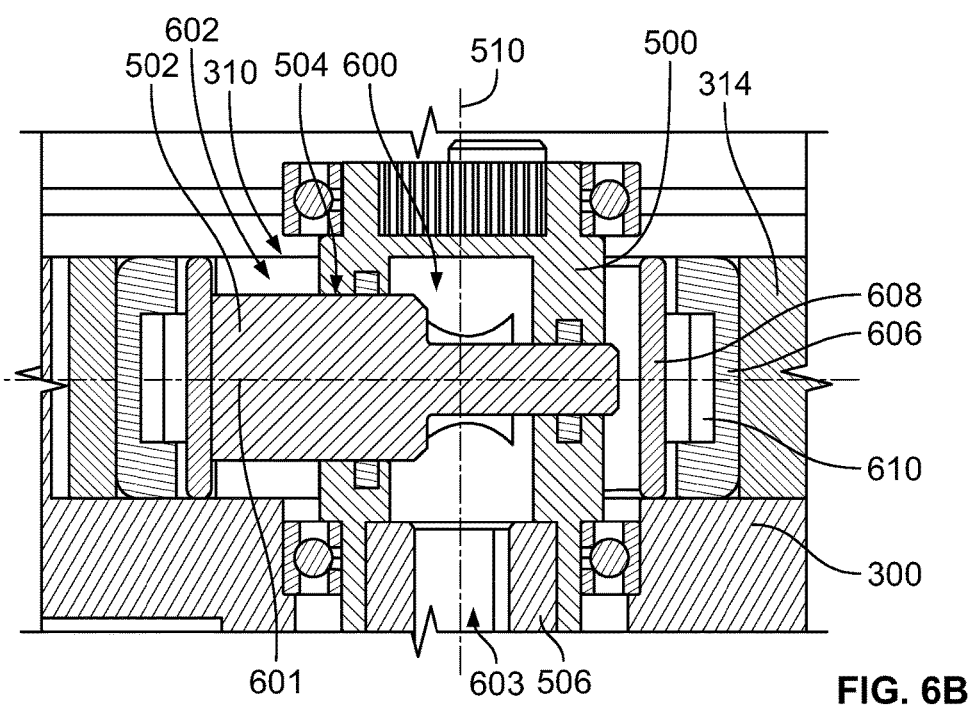
FIG. 6B is cross-sectional view of the example pump of FIG. 6A in the first position.

FIG. 6A is a top view of the example pump 310 in which the piston 502 is in an outward position and FIG. 6B is a cross-sectional view of the example pump 310 in the same position. As illustrated in FIG. 6B, the piston 502 extends into an inner chamber 600 of the cylinder 500 via the channel 504. The piston 502 is movable into and out of the inner chamber 600 in a linear direction along an axis 601 that is perpendicular to the rotational axis 510 of the pump 310 and shaft 506. The inner chamber 600 of the cylinder 500 is in fluid communication with an inner chamber 603 of the shaft 506. In other words, the cylinder 500 and the shaft 506 of the rotary valve 312 share a common inner chamber. In the illustrated example of FIGS. 6A and 6B, the pump 310 is disposed within the cam 314, which is disposed in the cam cavity 316 formed in the housing 300. In particular, the pump 310 is disposed within an opening 602 of the cam 314. In the illustrated example, the opening 602 is formed by a bearing 604. The bearing 604 includes an outer race 606 (e.g., an outer ring), an inner race 608 (e.g., an inner ring) and a plurality of rolling elements 610 (e.g., balls, needles, etc.) between the outer race 606 and the inner race 608. The inner race 608 forms the inner surface of the opening 602. The piston 502 is engaged with the inner race 608. As the cylinder 500 and the piston 502 rotate (e.g., via the motor 212 (FIG. 1)), the piston 502 rotates the inner race 608. Due to centrifugal forces, the piston 502 is biased outward toward the inner race 608. As depicted in FIGS. 6A and 6B, the pump 310 and the cam 314 are eccentric. In other words, the center of the cylinder 500 is offset from the center of the opening 602 of the cam 314. As a result, when the cylinder 500 and the piston 502 rotate, the piston 502 moves into and out of the inner chamber 600 of the cylinder 500, thereby creating a vacuum or pressure in the inner chambers 600, 603. For example, as the pump 310 rotates in the clockwise direction from the position in FIG. 6A, the piston 502 is pushed into the cylinder 500 as the piston 502 moves closer to the portion of the bearing 604 closest to the cylinder 500.

Figure 7A:
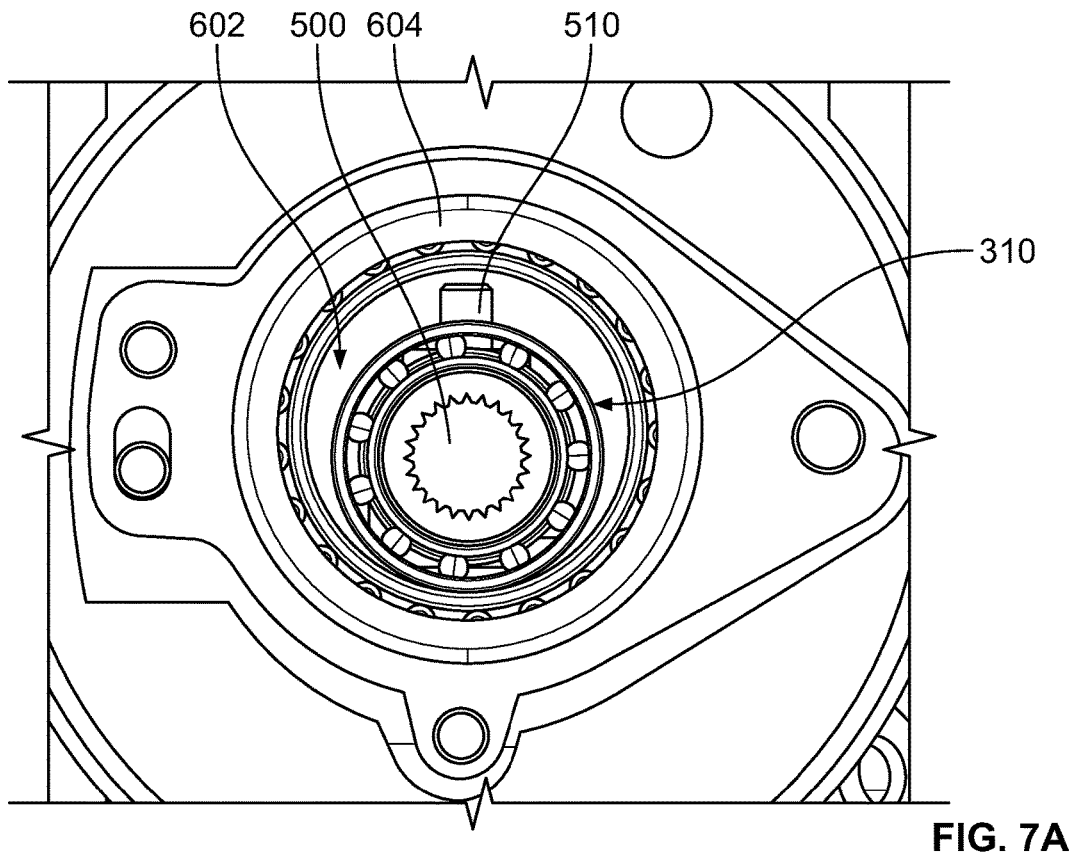
FIG. 7A is a top view of the example pump of FIG. 5 in a second position.
Figure 7B:
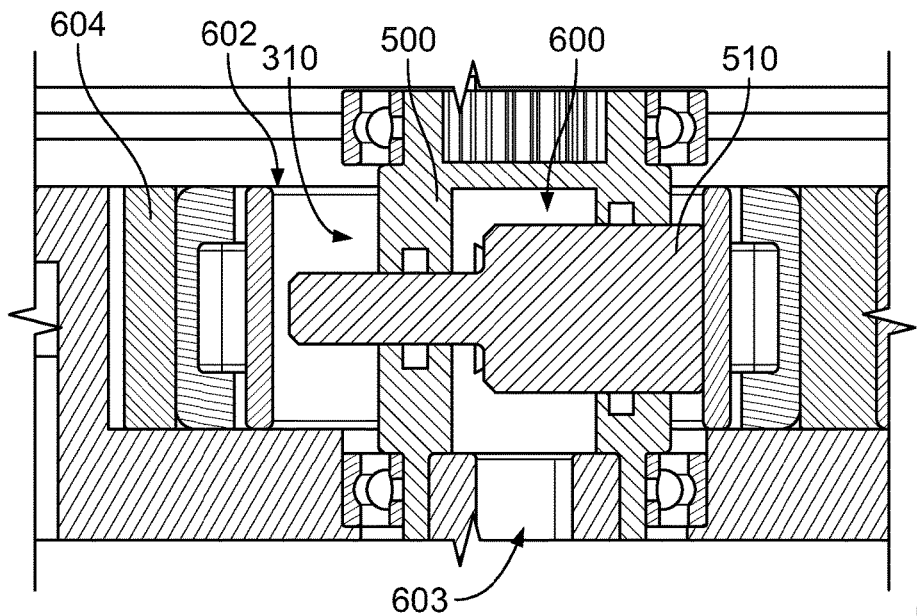
FIG. 7B is a cross-sectional view of the example pump of FIG. 7A in the second position.

For example, FIG. 7A is a top view of the example pump 310 and FIG. 7B is a cross-sectional view of the example pump 310 in which the piston 502 is in an inward position after being rotated 180° from the outward position in FIGS. 6A and 6B. In the position illustrated in FIGS. 7A and 7B, the piston 502 is disposed within the cylinder 500, which decreases the volume within the inner chamber 600 and, thus, creates a higher pressure in the inner chambers 600, 603. As the pump 310 continues to rotate and move back to the position in FIGS. 6A and 6B, the piston 502 moves outwardly (e.g., via centrifugal force), thereby creating a vacuum or negative pressure in the inner chamber 600 of the cylinder 500. While in the illustrated example the opening 602 is formed by the bearing 604, in other examples, the inner surface of the opening 602 may be stationary, and the piston 502 may slide along the inner surface of the opening 602.

The ports 512-518 (FIG. 5) of the rotary valve 312 (FIG. 5) are positioned to overlap as the pump 310 is creating a vacuum or pressure in the inner chambers 600, 603 of the cylinder 500 and the shaft 506. For example, when the pump 310 and the shaft 506 are rotated in one direction, the second ports 514, 518 overlap as the pump 310 is creating a vacuum in the inner chambers 600, 603 (e.g., moving from the position in FIG. 7A to the position in FIG. 6A), thereby drawing fluid from the reservoir 206 into the inner chambers 600, 603. As the pump 310 and the shaft 506 continue to rotate, the second ports 514, 518 close (e.g., are no longer overlapping) and the first ports 512, 516 overlap as the pump 310 is creating pressure in the inner chambers 600, 603 (e.g., moving from the position in FIG. 6A to the position in FIG. 7A), thereby pumping the fluid out of the inner chamber 600, 603 and into the brake 102 (FIG. 1). Thus, for every rotation of the pump 310 in one direction, the pump 310 pulls an amount of fluid from the reservoir 206 and pushes the fluid into the brake 102. Likewise, for every rotation of the pump 310 in the opposite direction, the pump 310 pulls an amount of fluid from the brake 102 and pushes the fluid back into the reservoir 206. In some examples, removing voltage to the motor 212 (e.g., unlocking the motor 212) may cause the pump 310 to rotate in the reverse direction and relieve pressure from the brake 102, as disclosed in further detail herein.

Figure 8:
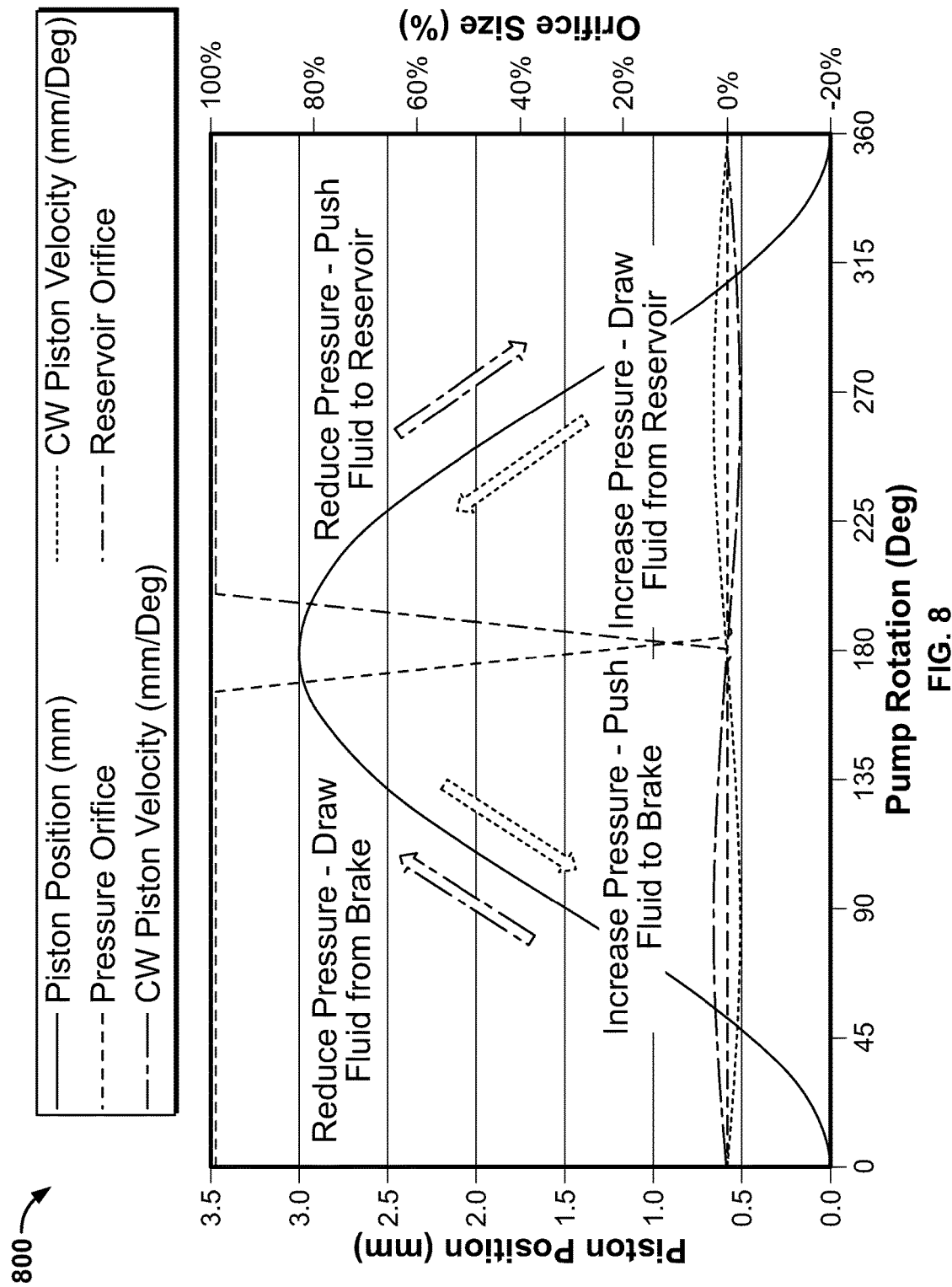
FIG. 8 illustrates an example valve timing graph showing the effect of the rotation of the example pump and the example valve of FIG. 5.

FIG. 8 illustrates an example valve timing graph 800. The graph 800 shows the relationship between the piston position, the size of the orifice created at the first ports 512, 516 ("pressure orifice"), the size of the orifice created at the second ports 514, 518 ("reservoir orifice"), the piston velocity when rotated in one direction (e.g., the clockwise direction) and the piston velocity when rotated in the opposite direction (e.g., the counter-clockwise direction). As can be seen in the graph 800, during a reduce pressure operation (top left), the piston position changes as the pump 310 rotates to draw fluid from the brake 102. During this time, the size of the orifice created by the first ports 512, 516 is relatively large and the size of the orifice created by the second ports 514, 518 is zero or substantially zero (e.g., to account for minor leakage). As the pump 310 continues to rotate and the piston position changes to push fluid to the reservoir 206 (top right), the size of the orifice created by the second ports 514, 518 is relatively large and the size of the orifice created by the first ports 512, 516 is zero or substantially zero. The pump 310 may also be rotated in the reverse direction to increase pressure to the brake 102, as depicted in the graph 800. The graph 800 also shows the velocity of the piston 502 when being rotated in one direction or the other direction.

In some examples, when a desired pressure in the brake 102 is achieved, the motor 212 (FIG. 2) is stopped, which prevents the pump 310 from rotating in either direction and, thus, holds the pressure in the brake 102. In some examples, the motor 212 is stopped by applying a voltage to the motor 212 (e.g., from the ECU 212 (FIG. 2)) that creates a torque that is substantially equal to the counter-torque created by the pressure on the pump 310. In other words, the motor 212 is in a steady state and the torque created by the motor 212 is balanced with the torque on the pump 310 created by the pressure at the outlet 108, thereby stopping the motor 212 from rotating and maintaining the pressure at the outlet 108. In some examples, the ECU 112 and/or the vehicle ECU 117 compares the pressure at the outlet 108 (e.g., as measured by the pressure sensor 332) to the target pressure using a proportional-integral-derivative (PID) controller and controls the voltage to the motor 212 based on the pressure difference. In some examples, to relieve braking pressure, the voltage is removed from the motor 212, which enables the pump 310 to rotate in the reverse direction and transfer fluid from the brake 102 to the reservoir 206. For example, if the voltage to the motor 212 is removed, the high pressure fluid in the upper section 528 of the bore and in the inner chambers 600, 603 pushes the piston 502 back outward. As a result, the cylinder 500 rotates to enable the piston to extend to the position shown in FIGS. 6A and 6B where the piston 502 is outward. Once the pump 310 starts rotating, it continues to rotate under this affect until the pressures stabilize. The rotating pump 310 rotates the output shaft of the motor 212. Additionally or alternatively, the motor 212 (FIG. 2) may be activated (e.g., via a voltage) to actively to drive the pump 310 in the reverse direction to pump fluid out of the brake 102 (FIG. 1) back into the reservoir 206 (FIG. 2).

Figure 9A:
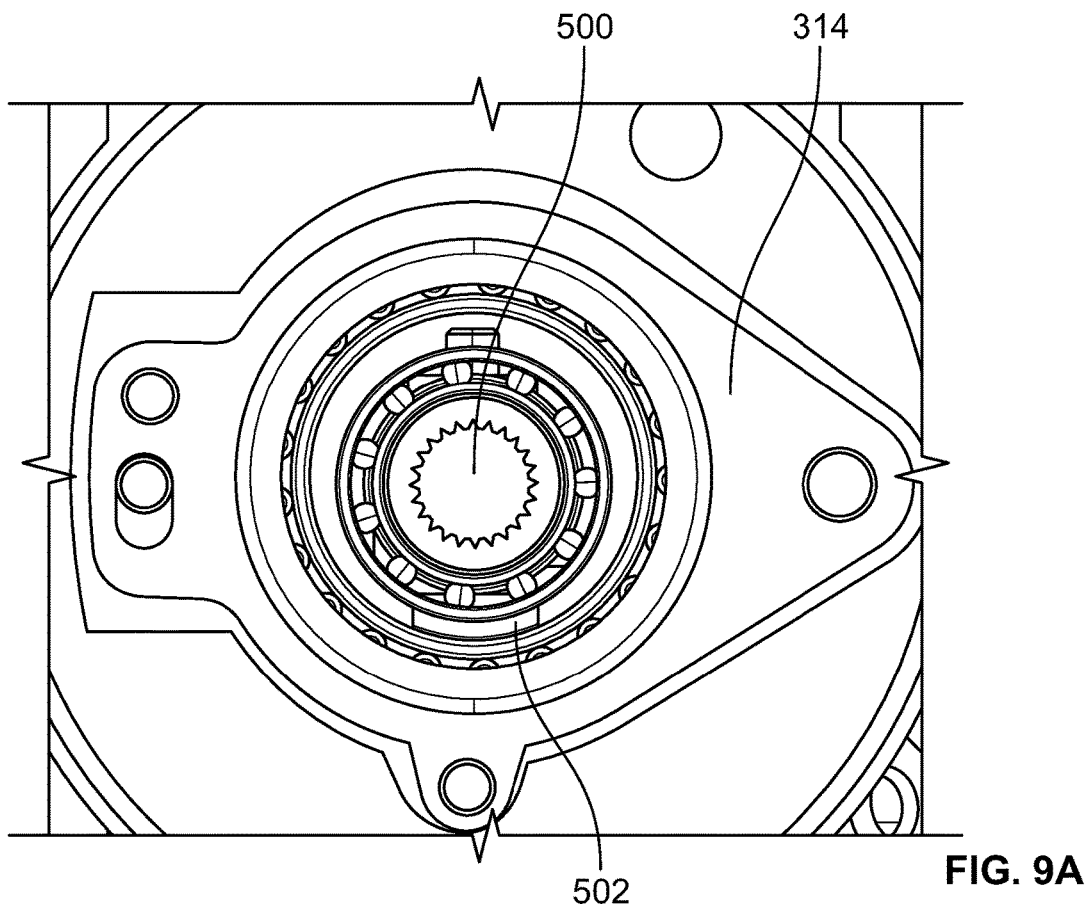
FIG. 9A is a top view of the example pump of FIG. 5 interfacing with an example cam in a different position than in FIGS. 6A and 7A.
Figure 9B:
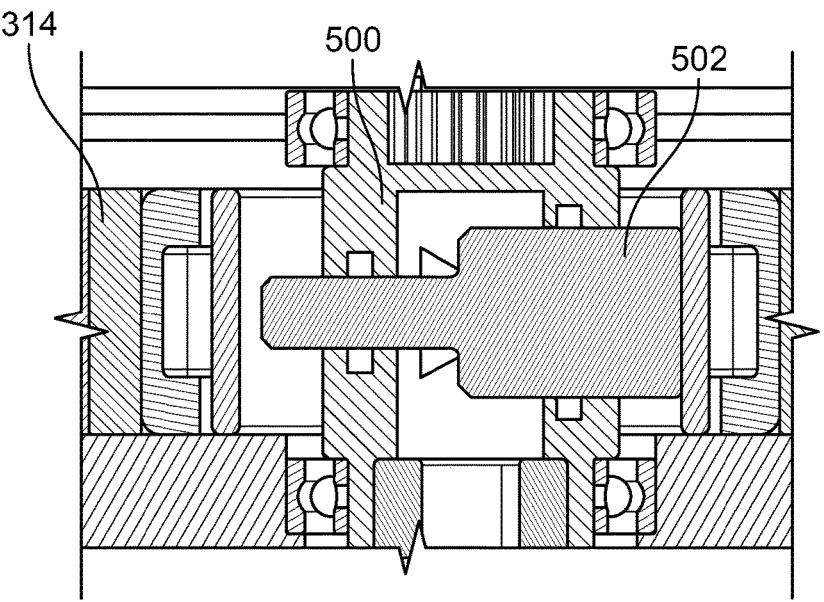
FIG. 9B is a cross-sectional view of the example pump of FIG. 9A.

As fluid is pumped into the brake 102 (FIG. 1), the pressure at the outlet 108 (FIG. 1) increases and, thus, more torque is needed to continue pumping the fluid into the brake 102. To offset the increasing torque needed to rotate the pump 310 (i.e., move the piston 502 inward and outward), the cam 314 may be moved to vary the displacement of the piston 502 and, thus, vary the torque needed to rotate the pump 310. For example, FIGS. 9A and 9B illustrate the cam 314 in a second position where the centers of the cam 314 and the cylinder 500 are closer to each other than the position shown in FIGS. 6A and 7A. As a result, the piston 502 is displaced (e.g., moved inward and outward) less during each rotation and, thus, less fluid is pumped during each rotation. In other words, the cam position in FIGS. 6A and 7A results in maximum flow, whereas the cam position in FIG. 9A results in minimum flow. The cam 314 may be positioned in the maximum flow position at the beginning of operation to quickly build pressure in the brake 102, and then may be moved to the position in FIG. 9A as pressure increases, which requires less power to rotate if the cam 314 were not moved. While less fluid is pumped in the cam position in FIG. 9A, this configuration enables the motor 212 (FIG. 2) to operate at relatively the same speed throughout the pumping operation. As such, the motor 212 (FIG. 2) can be driven at or near the maximum power output, which is more efficient than driving the motor at higher or lower speeds. Further, this configuration enables the use of a smaller motor that draws a smaller amount of current.

Figure 10:
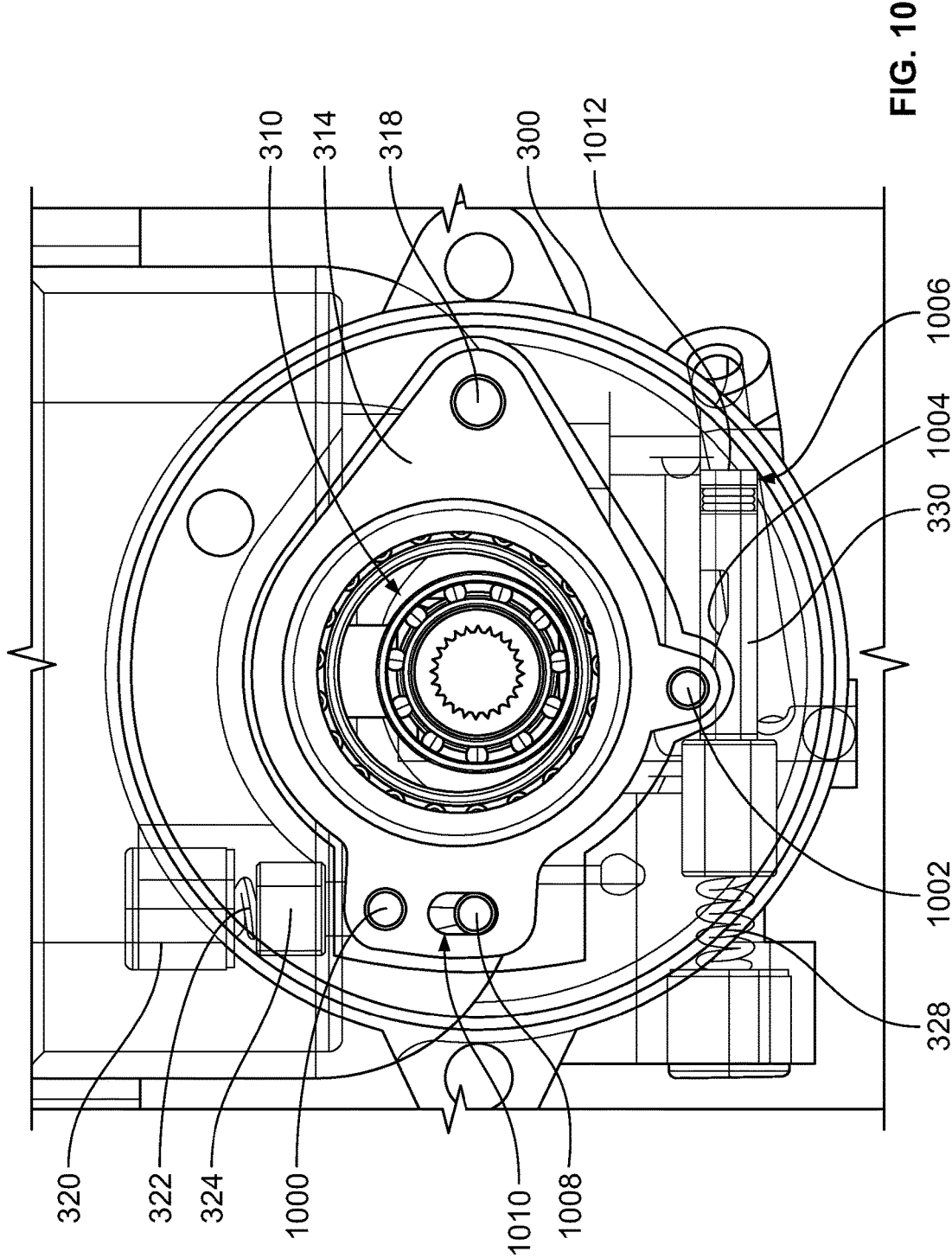
FIG. 10 is a top view of the example pump assembly of FIG. 2 showing an example flow control pin.

In some examples, the cam 314 is moved to the second position (downward in FIG. 9A) automatically as the pressure at the outlet 108 increases (e.g., via a pressure feedback). For example, as illustrated in FIG. 10, the cam 314 is pivotally coupled to the housing 300 via the pivot pin 318. In FIG. 10, the housing 300 is illustrated as transparent to expose the internal passageways and structures. In the illustrated example, the cam 314 is biased to the second position (downward or counter-clockwise in FIG. 10) via the spring 322, which urges the cam pusher 324 against the cam 314. In the illustrated example, the spring 322 is held in place by the retainer 320. The cam pusher 324 extends into the cam cavity 316. In the illustrated example, the cam pusher 324 pushes against a first pin 1000 on the cam 314. However, in other examples, the cam pusher 324 may push on other surfaces of the cam 314 to bias the cam 314 (downward in FIG. 10). In the illustrated example of FIG. 10, the cam 314 is prevented from moving downward or counter-clockwise by the flow control pin 330. In particular, the cam 314 includes a second pin 1002 that is engaged with the flow control pin 330. The flow control pin 330 has an angled surface 1004 and is movable in a linear direction (from left to right in FIG. 10) in a passageway 1006. As the flow control pin 330 is moved to the left in FIG. 10, the second pin 1002 slides downward along the angled surface 1004 and the cam 314 is enabled to rotate in the downward or counter-clockwise direction (e.g., via force from the spring 322). As a result, the position of the cam 314 (relative to the 310) changes, thereby decreasing the flow rate of the pump 310. In the illustrated example, a stop pin 1008 extends through a slot 1010 in the cam 314, which prevents the cam 314 from rotating beyond a predetermined distance in either direction.

Figure 11:
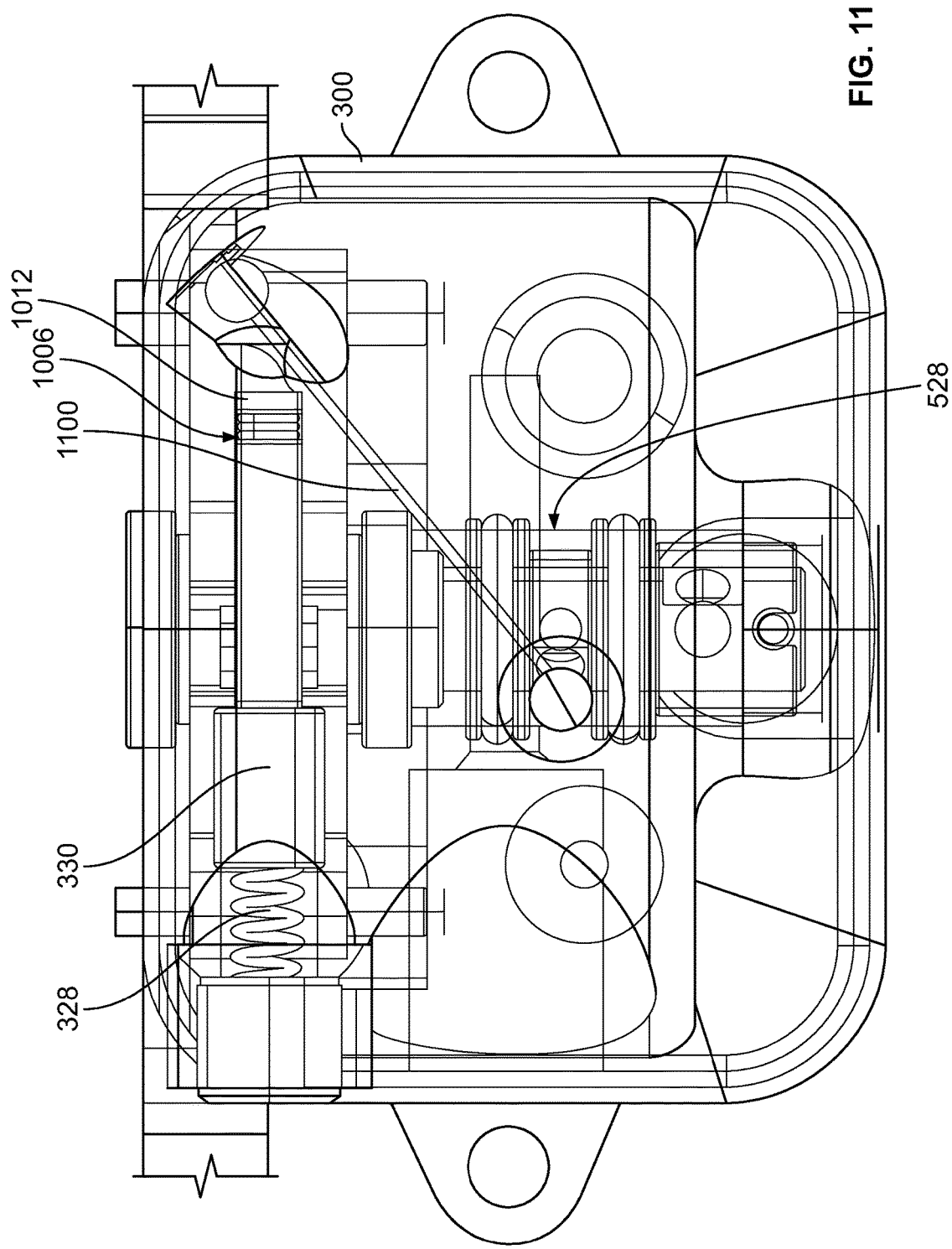
FIG. 11 is a side view of the example pump assembly with the example flow control pin of FIG. 10.

To move the flow control pin 330 in the passageway 1006, fluid from the upper section 528 (FIG. 5) of the bore 302 (FIG. 5) is routed to the passageway 1006 to push the flow control pin 330 to the left. For example, as illustrated in FIG. 11, a passageway 1100 fluidly couples the upper section 528 to the passageway 1006. In FIG. 11, the housing 300 is illustrated as transparent to expose the internal passageways and structures. As illustrated in FIGS. 10 and 11, the flow control pin 330 has a plug 1012 that is slidable within the passageway 1006. As the passageway 1006 is filled with high pressure fluid (from the upper section 528 of the bore 302), the plug 1012 (and, thus, the flow control pin 330) is moved to the left, thereby enabling the cam 314 to rotate (downward or counter-clockwise in FIG. 10). As the pressure in the passageway 1006 decreases, the flow control pin 330 is moved back to the right via the spring 328. Thus, as the pressure at the outlet 108 increases, the position of the cam 314 is changed to affect the flow rate of the pump 310, thereby enabling the motor 212 (FIG. 2) to continue to operate at a relatively constant torque and speed. In the illustrated example, the spring 328 keeps the flow control pin 330 in the rightward position. The spring 328 may be selected based on a spring constant (k) that results in the desired change in flow rate. For example, a spring with a higher spring constant (k) may provide less change in flow rate as the pressure increases, whereas a spring with a lower spring constant (k) may provide more change in flow rate as the pressure increases. In some examples, the spring 328 has a spring constant (k) of 6.3 Newton/millimeters (N/mm). In other examples, the spring 328 may have a spring constant that is higher or lower.

While an example manner of implementing the brake control system 115 is illustrated in FIG. 1, one or more of the elements, processes and/or devices illustrated in FIG. 1 may be combined, divided, re-arranged, omitted, eliminated and/or implemented in any other way. Further, the example ECU 112, the example vehicle ECU 117 and/or, more generally, the example brake control system 115 of FIG. 1 may be implemented by hardware, software, firmware and/or any combination of hardware, software and/or firmware. Thus, for example, the example ECU 112, the example vehicle ECU 117 and/or, more generally, the example brake control system 115 of FIG. 1 could be implemented by one or more analog or digital circuit(s), logic circuits, programmable processor(s), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, the example ECU 112 and/or the example vehicle ECU 117 is/are hereby expressly defined to include a tangible computer readable storage device or storage disk such as a memory, a digital versatile disk (DVD), a compact disk (CD), a Blu-ray disk, etc. storing the software and/or firmware. Further still, the example brake control system 115 of FIG. 1 may include one or more elements, processes and/or devices in addition to, or instead of, those illustrated in FIG. 1 and/or may include more than one of any or all of the illustrated elements, processes and devices.

Figure 12:
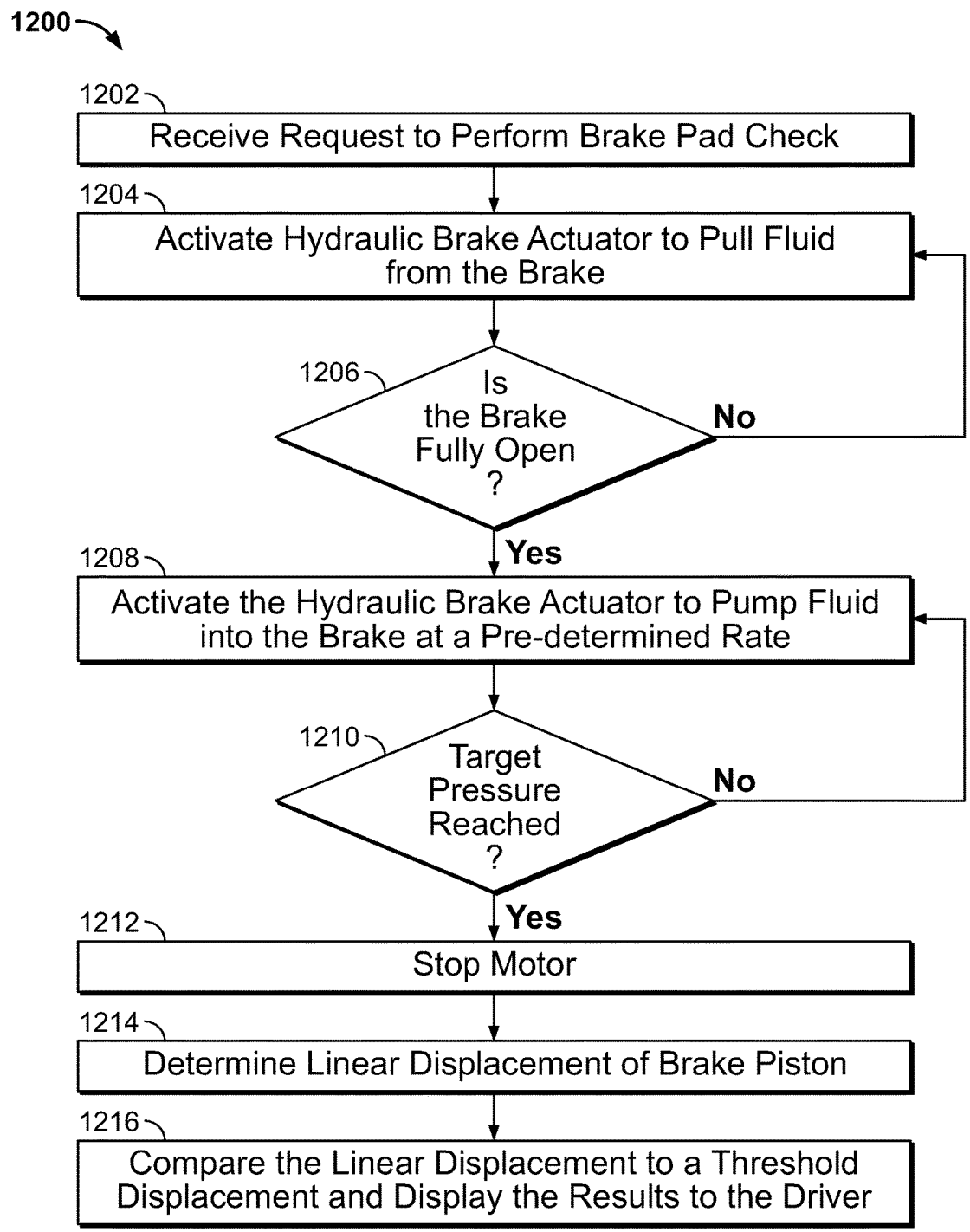
FIG. 12 is a flowchart representative of an example method that may be executed by an example brake control system to check pad wear of an example brake using the example hydraulic brake actuator of FIG. 1.

A flowchart representative of example method for implementing the brake control system 115 of FIG. 1 is shown in FIG. 12. In this example, the method may be implemented by machine readable instructions that comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example brake control system 115 may alternatively be used. For example, the order of execution of the blocks may be changed, and/or some of the blocks described may be changed, eliminated, or combined.

As mentioned above, the example method of FIG. 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 12 is a flowchart representative of an example method 1200 of performing a brake pad check implemented by the example brake control system 115 (e.g., the ECU 112 and/or the vehicle ECU 117) and the example hydraulic brake actuator 100 of FIG. 1. At block 1202, the vehicle ECU 117 receives a request to perform a break pad check on the brake 102. In some examples, a driver requests a brake pad check by activating/selecting the pad check request button 118. In some examples, the pad check request button 118 is part of the vehicle infotainment system. Additionally or alternatively, the vehicle ECU 112 may be programmed to periodically perform a brake pad check (e.g., once a month). At block 1204, the ECU 112 activates (e.g., in response to a request from the vehicle ECU 112) the hydraulic brake actuator 100 to pull fluid from the brake 102 until the brake 102 is open. For example, the ECU 112 may activate the motor 212 to rotate the pump 310 to pump fluid out of the brake 102 and into the reservoir 206. At block 1206, the ECU 112 (and/or the vehicle ECU 117) determines whether the brake 102 is opened (e.g., retracted), such as fully opened. In some examples, the ECU 112 determines the brake 102 is fully open when no more fluid can be pumped from the brake 102 and/or based on the pressure at the outlet 108 (e.g., measured by the pressure sensor 332). If the brake 102 is not fully opened, the motor 212 continues to drive the pump 310 (at block 1204).

Once the brake 102 is fully opened, the ECU 112 activates (e.g., in response to a request from the vehicle ECU 112) the hydraulic brake actuator 100 to pump fluid into the brake 102 at a predetermined rate at block 1206. For example, the ECU 112 may activate the motor 212 to run at a particular speed to pump fluid into the brake 102. As the pump 310 is pumping fluid into the brake 102, the ECU 112 measures the pressure of the fluid in the brake 102 (e.g., at the outlet 108) using the pressure sensor 332. At block 1210, the ECU 112 compares the pressure at the outlet 108 to a target or threshold pressure. If the target pressure is not reached, the ECU 112 continues to activate the motor 212 to pump fluid into the brake 102 (at block 1208). Once the target pressure is reached (determined at block 1210), the ECU 112 stops the motor 212 at block 1212. The vehicle ECU 117 may determine an amount of pad wear of the brake 102 based on a run time of the motor 212 until the target pressure is reached. For example, at block 1214, the vehicle ECU 117 determines the linear displacement of the brake piston (in the brake cylinder 106) based on the run time of the motor 212. A shorter run time indicates the pads 104 are in good condition because the pads 104 engaged the rotor/drum relatively quickly, whereas a longer run time indicates the pads 104 are worn down and, therefore, took longer to engage the rotor/drum. At block 1216, the vehicle ECU 117 compares the linear displacement (which may correspond to the amount of pad wear) to a threshold displacement, such as an allowable pad wear. The vehicle ECU 117 communicates the results (e.g., the amount of pad wear) and/or an alert message to the driver if the pads are worn and need to be replaced. In some examples, the results and/or alert message are displayed in the infotainment system 120 of the vehicle. For example, the infotainment system 120 may display a level of pad wear from 1-5, where 1 indicates the pads 104 are worn out and need replacing whereas a 5 indicates the pads 104 are in good condition and do not need to be replaced. In other examples, other types of alerts and/or information relating to the pad wear may be displayed.

Figure 13:
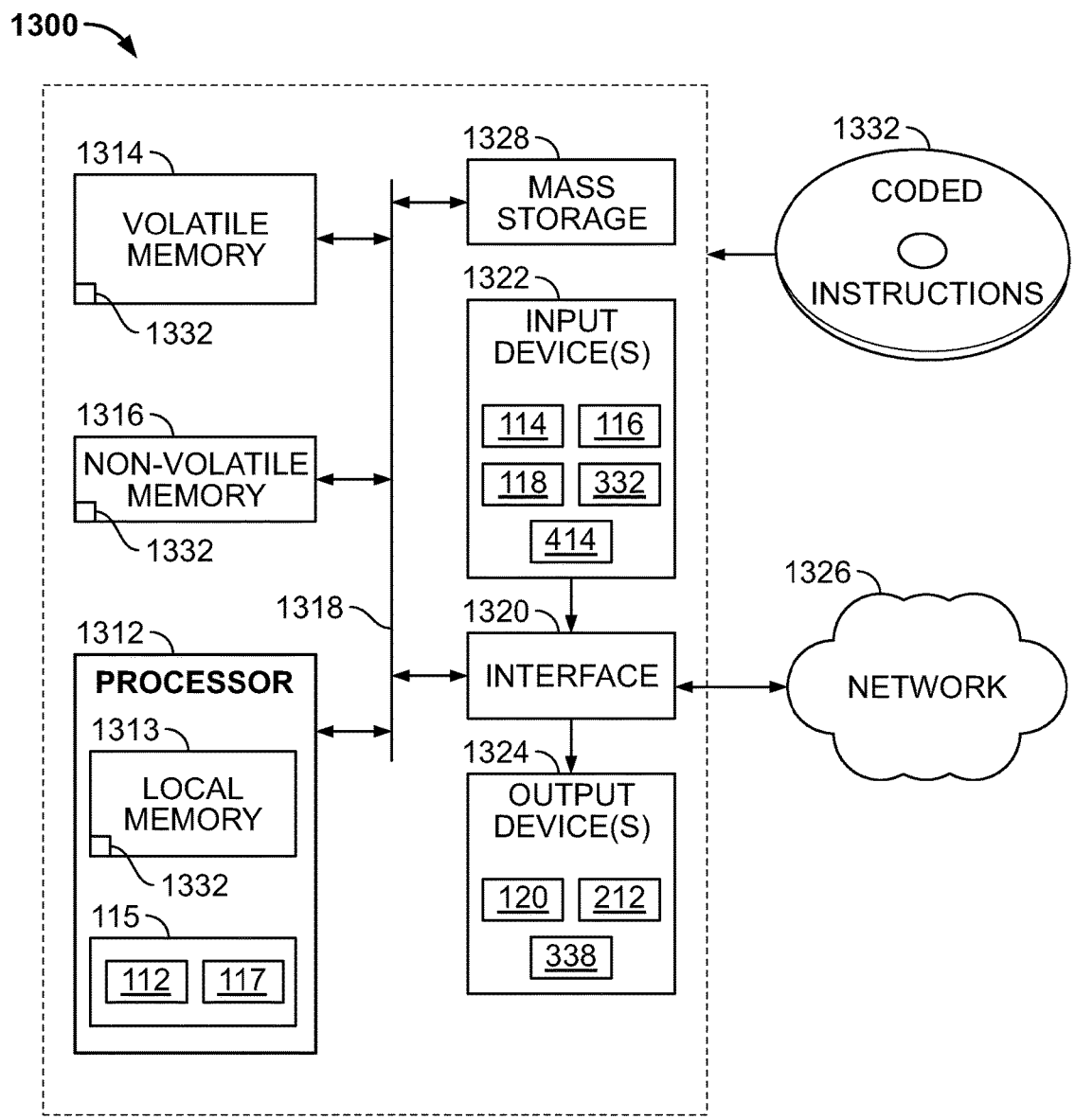
FIG. 13 is an example processor platform diagram that may implement the method of FIG. 12 and the example brake control system to control the example hydraulic brake actuator of FIG. 1.

FIG. 13 is a block diagram of an example processor platform 1300 capable of executing instructions to implement the method 1200 of FIG. 12 and brake control system 115 of FIG. 1. The processor platform 1300 can be, for example, a server, a personal computer, a mobile device (e.g., a cell phone, a smart phone, a tablet such as an iPad™) or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In this example, the processor 1312 may implement the ECU 112, the vehicle ECU 117 and/or, more generally, the brake control system 115.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) 1322 may include the example pedal position sensor 114, the example wheel speed sensor 116, the example pad check request button 118, the example pressure sensor 332 and/or the example fluid level sensor 414.

One or more output device(s) 1324 are also connected to the interface circuit 1320 of the illustrated example. The output device(s) 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor. In this example, the output device(s) 1324 may include the example infotainment system 120 (which may also be an input device 1322), the example motor 212 and/or the example coil 338 of the solenoid for operating the park brake function.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 to implement the method 1200 of FIG. 12 may be stored in the mass storage device 1328, in the volatile memory 1314, in the non-volatile memory 1316, and/or on a removable tangible computer readable storage medium such as a CD or DVD From the foregoing, it will be appreciated that the above disclosed hydraulic brake actuators provide bi-directional pumping of fluid to and from a brake. The hydraulic brake actuator may be coupled to or near the brake, thereby eliminating the need for lengthy brake fluid lines as used in known vehicle brake systems. Thus, the example hydraulic brake actuators reduce the amount of weight added to vehicle by the braking system. Additionally, the example hydraulic brake actuators may also be used to provide ABS functions. Thus, the same hydraulic brake actuator may be used for both normal braking functions and for ABS functions, thereby eliminating the need for separate braking and ABS systems as implemented in known systems. Moreover, unlike known ABS systems that utilize a separate relief system and pump system (which often utilize three valves per corner/channel (and, thus, twelve valves per vehicle)), the example hydraulic brake actuators utilize the same pump to pump fluid into the brake and out of the brake. Thus, the example hydraulic brake actuators utilized significantly less parts and components than known ABS systems.

Further, the example hydraulic brake actuators utilize a radial piston pump that can produce relatively high output pressure, which may be desirable on larger vehicles such as pickup trucks. Also, some of the example hydraulic brake actuators utilize rotary valves, which have simplified functionality, lower costs, and minimal pumping losses. Additionally, some of the example hydraulic brake actuators utilize an external cam (as opposite to an internal cam), which enables the pump to be integrated with the rotary valve. The integrated pump and valve design is more compact (e.g., smaller) than known ball screw brake pumps (which are required for electronic brake boost (EBB)) and, thus, the resulting structure is lighter and requires less space to accommodate than known systems. Further, with an external cam, rotating the pump generates centrifugal force during actuation that eliminates the need for a piston return spring and simplifies the design. Also, the movable cam enables the flow rate of the pump to be changed. The variable cam allows for increased flow at low pressures for faster pressure build times, and also allows for decreased flow at higher pressures, thereby enabling the use of a smaller motor with lower current draw.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A hydraulic brake actuator comprising:
a rotary valve disposed in a bore of a housing, the rotary valve including a shaft rotatably disposed within a sleeve, the sleeve and the shaft having ports that align at certain rotational positions to create a flow path between the bore and an inner chamber of the shaft;
a cam having an opening;
a pump disposed in the opening of the cam and coupled to the shaft to increase and decrease a pressure within the inner chamber of the shaft; and
a moveable pin disposed in a first passageway in the housing, the cam biased against the pin such that linear movement of the pin causes movement of the cam, a second passageway in the housing to supply fluid from the bore to the first passageway to move the pin.

2. The hydraulic brake actuator of claim 1, wherein the pump includes a cylinder coupled to the shaft, an inner chamber of the cylinder in fluid communication with the inner chamber of the shaft.

3. The hydraulic brake actuator of claim 2, wherein the pump includes a piston that is movable into and out of the inner chamber of the cylinder to increase and decrease the pressure in the inner chamber of the shaft.

4. The hydraulic brake actuator of claim 3, wherein the piston extends outwardly from the cylinder and engages an inner surface of the cam defining the opening.

5. The hydraulic brake actuator of claim 4, wherein the cam and the pump are eccentric such that as the pump rotates within the opening of the cam, the piston moves linearly into and out of the inner chamber of the cylinder.

6. The hydraulic brake actuator of claim 4, wherein the cam is movable to change a distance between the cylinder and the inner surface of the opening of the cam.

7. The hydraulic brake actuator of claim 6, wherein the pin has an angled surface, and wherein the cam is biased against the angled surface.

8. The hydraulic brake actuator of claim 3, wherein the piston is movable in a linear direction along an axis that is perpendicular to a rotational axis of the shaft and the pump.

9. The hydraulic brake actuator of claim 1, wherein the sleeve includes a seal that divides the bore into an upper section and a lower section, a first port of the sleeve aligned with the upper section of the bore and a second port of the sleeve aligned with the lower section of the bore.

10. The hydraulic brake actuator of claim 9, wherein the housing includes a third passageway between the upper section of the bore and an outlet of the housing to be coupled to a brake, and a fourth passageway between the lower section and a reservoir of fluid.

11. The hydraulic brake actuator of claim 1, further including a reservoir to contain fluid, the reservoir coupled to the housing, where the pump is a radial piston pump disposed within the housing, the radial piston pump including a cylinder and a piston movable into and out of the cylinder, the cylinder disposed within the cam, and further including; a motor to rotate the radial piston pump in a first direction to pump fluid from the reservoir to a brake and rotate the radial piston pump in a second direction to pump fluid from the brake to the reservoir.

12. The hydraulic brake actuator of claim 11, wherein the cylinder of the radial piston pump is coupled to the shaft and defines the inner chamber within the shaft.

13. The hydraulic brake actuator of claim 12, wherein the sleeve includes first and second ports and the shaft includes first and second ports that are to overlap with the respective first and second ports of the sleeve as the shaft rotates.

14. The hydraulic brake actuator of claim 13, wherein, when the first ports at least partially overlap, a first flow path is formed between the inner chamber and the reservoir, and when the second ports at least partially overlap, a second flow path is formed between the inner chamber and the brake.

15. The hydraulic brake actuator of claim 11, wherein the cam is movable to change a displacement of the piston.

16. The hydraulic brake actuator of claim 11, wherein the motor is to alternately rotate the radial piston pump in the first direction and the second direction to perform an anti-lock braking operation.

17. The hydraulic brake actuator of claim 10, wherein the second passageway fluidly couples the upper section of the bore to the first passageway.

18. The hydraulic brake actuator of claim 1, further including a spring to bias the pin against a pressure of the fluid in the first passageway.

19. The hydraulic brake actuator of claim 1, further including a spring to bias the cam into the pin.

20. The hydraulic brake actuator of claim 11, further including a fluid level sensor to detect a level of fluid in the reservoir.

\* \* \* \* \*